United States Patent
Fujiwara et al.

(10) Patent No.: US 10,101,022 B2
(45) Date of Patent: Oct. 16, 2018

(54) FLUID UTILIZATION FACILITY MANAGEMENT METHOD AND FLUID UTILIZATION FACILITY MANAGEMENT SYSTEM

(71) Applicant: TLV Co., Ltd., Kakogawa-shi (JP)

(72) Inventors: Yoshiyasu Fujiwara, Kakogawa (JP); Kazunori Oda, Kakogawa (JP); Noriaki Tsuchiiwa, Kakogawa (JP); Tomoyuki Shiraishi, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 122 days.

(21) Appl. No.: 15/316,395

(22) PCT Filed: May 25, 2015

(86) PCT No.: PCT/JP2015/064921
§ 371 (c)(1),
(2) Date: Dec. 5, 2016

(87) PCT Pub. No.: WO2015/186554
PCT Pub. Date: Dec. 10, 2015

(65) Prior Publication Data
US 2017/0153023 A1    Jun. 1, 2017

(30) Foreign Application Priority Data
Jun. 6, 2014 (JP) ................. 2014-117582

(51) Int. Cl.
*F22B 37/26* (2006.01)
*F16T 1/48* (2006.01)

(52) U.S. Cl.
CPC ............... *F22B 37/26* (2013.01); *F16T 1/48* (2013.01)

(58) Field of Classification Search
CPC ................................. F22B 37/26; F16T 1/48
See application file for complete search history.

(56) References Cited

U.S. PATENT DOCUMENTS

| 7,912,675 B2 | 3/2011 | Quake et al. | |
| 2007/0057802 A1* | 3/2007 | Fujiwara | F16T 1/48 340/605 |
| 2007/0282458 A1* | 12/2007 | Yamada | G05B 19/0423 700/2 |
| 2008/0249744 A1* | 10/2008 | Fujiwara | G05B 23/0254 702/183 |
| 2009/0043406 A1* | 2/2009 | Gauder | C02F 1/008 700/30 |
| 2009/0044042 A1 | 2/2009 | Fujiwara et al. | |
| 2009/0299676 A1 | 12/2009 | Fujiwara | |

(Continued)

FOREIGN PATENT DOCUMENTS

| JP | 355403 A | 3/1991 |
| JP | 2003130289 A | 5/2003 |

(Continued)

*Primary Examiner* — Nathaniel Herzfeld
(74) *Attorney, Agent, or Firm* — The Webb Law Firm

(57) ABSTRACT

A method for optimizing a fluid utilization facility. The method includes monitoring an operating state of a fluid utilization device and an operating state of a drain trap in a fluid utilization facility based on detection information obtained by detectors installed in various places in the fluid utilization facility. A running state of the fluid utilization facility is optimized based on a monitoring result.

12 Claims, 13 Drawing Sheets

(56) References Cited

U.S. PATENT DOCUMENTS

| | | | |
|---|---|---|---|
| 2011/0060567 A1* | 3/2011 | Fujiwara | F01K 13/02 703/6 |
| 2011/0185732 A1* | 8/2011 | Eppendorfer | F01D 1/023 60/645 |
| 2011/0295561 A1* | 12/2011 | Nagase | G05B 19/4183 702/188 |
| 2012/0010757 A1* | 1/2012 | Francino | G05B 15/02 700/291 |
| 2012/0010758 A1* | 1/2012 | Francino | G05B 17/02 700/291 |
| 2012/0151924 A1* | 6/2012 | Janvier | F01K 13/00 60/653 |
| 2013/0047613 A1 | 2/2013 | Holt et al. | |
| 2013/0118614 A1 | 5/2013 | Mcfeeters | |
| 2014/0058534 A1 | 2/2014 | Tiwari et al. | |
| 2017/0081976 A1* | 3/2017 | Tsuchiiwa | F01D 21/00 |

FOREIGN PATENT DOCUMENTS

| | | |
|---|---|---|
| JP | 2005114366 A | 4/2005 |
| JP | 2005114409 A | 4/2005 |
| JP | 2005115456 A | 4/2005 |
| JP | 2005182371 A | 7/2005 |
| JP | 2006194531 A | 7/2006 |
| JP | 2008144995 A | 6/2008 |
| JP | 200952412 A | 3/2009 |
| JP | 2009276923 A | 11/2009 |
| WO | 2007013468 A1 | 2/2007 |
| WO | 2009025165 A1 | 2/2009 |
| WO | 2014031264 A2 | 2/2014 |

\* cited by examiner

Fig. 14

| IMPROVEMENT IDEAS | |
|---|---|
| (1) ☐ | Cool flash steam (steam) from collecting drain pipe with cooling tower to undo invisible state |
| (2) ☐ | Cause superheater equipment that is using middle-pressure steam, to use low-pressure steam by changing piping |
| (3) ☑ | Repair location from which steam is leaking (valves, traps) |
| (4) ☐ | Suction low-pressure steam with steam compressor to perform modification and efficiently use the steam |
| (5) ☐ | Stop steam turbine and preferentially use inexpensive motor-side pump for reduction in electrical charges |
| .... | |

Gg

FLUID UTILIZATION FACILITY MANAGEMENT METHOD AND FLUID UTILIZATION FACILITY MANAGEMENT SYSTEM

CROSS-REFERENCE TO RELATED APPLICATIONS

This application is the United States national phase of International Application No. PCT/JP2015/064921 filed May 25, 2015, and claims priority to Japanese Patent Application No. 2014-117582 filed Jun. 6, 2014, the disclosures of which are hereby incorporated in their entirety by reference.

TECHNICAL FIELD

The present invention relates to a fluid utilization facility management method for optimizing a running state of a fluid utilization facility, and a fluid utilization facility management system for implementing this fluid utilization facility management method.

BACKGROUND ART

As industrial plants, fluid utilization facilities that run or perform production using fluids such as steam and gas other than steam (air or various gas fuels including propane gas and methane gas) are common and in wide use. For example, in a steam utilization facility, which is a kind of such fluid utilization facility, drain water, which is a condensate, is produced from steam as a result of running the steam utilization facility. Therefore, in order to remove this drain water from steam pipes, a large number of steam traps are arranged in a dispersed manner on the steam pipes in the steam utilization facility. If an abnormality occurs in these steam traps as in the case where steam leaks or drain water is not appropriately discharged, energy loss occurs, and moreover, the running efficiency in the steam utilization facility decreases, resulting in considerable losses. For this reason, in order to manage the steam utilization facility, the state of steam traps that are arranged in a dispersed manner on the steam pipes in the steam utilization facility is monitored.

Conventionally, as a method for monitoring individual steam traps in the steam utilization facility, a method has been proposed in which steam trap monitoring devices that transmit data detected by a sensor to a computer are installed on respective steam traps, the data on the individual steam traps is collected into the computer from these steam trap monitoring devices, and the data is analyzed using the computer to monitor the state of the individual steam traps (e.g. see Patent Document 1).

Note that the above situation is not limited to steam utilization facilities but is common to fluid utilization facilities across the board, and the above conventional method is applicable to general fluid utilization facilities. In this case, the terms may be replaced with other appropriate terms. For example, "steam" may be replaced with various "fluids", and "steam trap" may be replaced with "drain trap".

PRIOR ART DOCUMENTS

Patent Documents

Patent Document 1: U.S. Pat. No. 7,912,675B

DISCLOSURE OF THE INVENTION

Problem to be Solved by the Invention

For example, considering the above conventional method with regard to steam utilization facilities, the above conventional method is merely for monitoring the state of individual steam traps regarding, for example, whether the operation of the individual steam traps is normal, or regarding prediction of the timing of failure, and is insufficient in terms of optimization of the running state of the steam utilization facility.

Here is a detailed description. First, "optimization" mentioned here means, for example, a state where a steam system in the steam utilization facility is appropriate for the running of a target steam utilization facility regarding various points in that the models of the devices that constitute a steam system, such as steam utilization devices and steam traps, suits the running of the steam utilization facility and the operating states of those devices are normal, the layout of pipes for transporting the steam is appropriate, steam-saving is sufficiently achieved, $CO_2$ reduction is also achieved as a result of steam-saving, and drain water is appropriately discharged. For example, in a state where the steam system is appropriate, i.e. in an optimized state of the running state of a steam utilization facility, a state conforming to the rules and principles of steam utilization is achieved, where (1) drain water generated in a steam system is discharged appropriately and promptly, (2) steam does not leak from the steam system, and (3) the steam system is always filled with steam.

In a steam utilization facility, steam generated by a boiler is transported through a steam pipe, and is collected after being used in steam utilization devices. In order to efficiently use the steam, in the steam utilization facility, the steam is used in a plurality of steam utilization devices after being generated, until it is collected, and the collected drain water is reused in the form of so-called flash steam due to re-evaporation, for example. Thus, the steam use status in the steam utilization facility is complex.

Because of such a complex steam use status, the system of the steam pipes and the drain water pipes in the steam utilization facility is also complex, and there are many kinds of applications and many models of the steam traps arranged on the steam pipes. Therefore, the steam system in the steam utilization facility is complex and becomes less comprehensive. As a result, it is difficult to precisely evaluate the steam system, and the steam utilization facility is run while it is not sufficiently examined as to whether the current steam system is in an optimal state in the steam utilization facility (i.e. whether the above-listed points for the optimization are satisfied).

In the above current situation, it is unclear whether the running state of the steam utilization facility is optimized, and there is a possibility that the steam utilization facility is being run while some kind of fundamental problem exists in the steam system. Then, for example, if the steam system has a problem in drainage, a load is applied to the steam utilization devices, and the running efficiency in the steam utilization facility decreases and energy loss occurs. If steam-saving is not sufficiently achieved in the steam system, it leads to an increase in costs and increases the amount of steam to be processed, and then, a failure is more likely to occur in devices such as the steam traps. Thus, various problems are derived from the fundamental problem in the steam system.

Even if the state of the individual steam traps is monitored with the aforementioned conventional steam trap monitoring method, and repair and replacement are sequentially performed every time an abnormality is detected to keep the steam traps in the steam utilization facility in a sound state, this means that the problem of failure in the steam traps that is a problem deriving from the fundamental problem is solved, which is only a quick-fix measure. The fundamental problem in the steam system in the steam utilization facility is not solved by this method. This is the reason why the above conventional method is insufficient in terms of comprehensive management of the steam utilization facility.

Specific exemplary problems that occur because the running state of the steam utilization facility is not optimized are listed below.

(1) As an exemplary case where the steam system has a problem in drainage, it is conceivable that steam traps of an optimum model that is optimal for the characteristics of locations (Condensate Discharge Location: CDL (registered trademark)) at which drain water is to be discharged appropriately and promptly from the steam system are not selected. For example, the case where temperature adjustment traps, which are steam traps of one model that adjust the temperature by retaining the drain water, are used in the steam utilization devices or main steam pipes where drain water is not to be retained applies to this example.

(2) As another exemplary case where the steam system has a problem in drainage, steam trap failures are conceivable. Steam trap failures are roughly divided into two types, namely a clogging failure and a leakage failure. The clogging failure refers to a failure in which a steam trap is clogged and drain water is not smoothly discharged, and has the risk of causing a critical problem in the steam utilization devices and the steam system. The leakage failure refers to a failure in which, although the steam traps are required, as is their original function, to discharge only drain water while inhibiting outflow of the steam, the steam flows out beyond the allowable limit, which may result in steam loss. These failures will lead to significant economic loss, as well as to the degradation of the safety and reliability of the plant due to the occurrence of water hammer or the like, and furthermore to environmental issues such as an increase in $CO_2$ emission.

(3) If a steam trap fails, it needs to be promptly replaced with a steam trap of an optimum type. However, if a cut-off valve is not installed on the upstream side of the steam trap or if the installation location of the cut-off valve is unknown, the failed trap cannot be replaced because the inflow of the steam to the failed trap cannot be stopped, and the risk that accompanies the clogging failure and the leakage failure cannot be immediately solved in some cases.

(4) This is often the case where dangerous and non-economic operation is still performed in which copper pipe steam tracers that are attached to an important instrument and a product which has a risk of causing fluidity failure if its temperature decreases are not managed as items in the steam system (i.e. the copper pipe steam tracers are not included in management items in the steam system that is systematically managed), it is determined everyday by touch whether a clogging failure is likely to occur in a steam trap mounted on each copper pipe steam tracer, and if it is suspected that the temperature is decreasing, a joint is loosened to intentionally let out the steam.

(5) There are a few cases where steam utilization devices that directly relate to production in a steam plant, such as a steam turbine, a reaction tank, a reboiler, and various kinds of heat exchangers, are managed in a state where the aforementioned rules and principles in steam utilization are met, i.e. drain water generated in the steam system is appropriately and promptly discharged. For this reason, the steam utilization devices are run while there is a failure in drainage, and an administrator finds the failure only after an alarm rings based on an index that is managed by a DCS (Distributed Control System).

(6) If the steam traps are not appropriately managed, the risk of steam leaking from the steam traps increases. The amount of steam that may possibly be lost due to the steam leakage due to inappropriate management of the steam traps increases in proportion to the number of steam traps. Furthermore, steam leaking to the outside of the steam system is not only a leakage from the steam traps, but the steam may also leak from various valves and joints, the number of which is larger than that of the steam traps, and the amount of steam leaking from the valves and joints may not be negligible.

Thus, in the field of industrial plants in the current situation, the inside of the steam system is not visualized at all, and it can be said that whether the steam system is in an optimal state is unknown (i.e. in a state of having become less comprehensive). However, for example, if it is possible to visualize that all drain water discharge locations are optimized (i.e. the steam traps are in a normal state without clogging or leakage), the steam utilization facilities including the steam tracer are optimized, and the balance between heat and electric power is also optimized, the steam system will be no longer incomprehensible, and it is possible to consider the overall steam system to be an important asset and to manage the overall steam system (asset management).

Note that, in this specification, the term "asset management" may be used to mean that human errors can be reduced by performing management while making clear the allowable usage range of each device in a situation where the percentage of human errors will further increase from now on in safe and stable operations of industrial plants. Accordingly, it can be said that the asset management in the steam system is a concept in which the steam system, which includes the steam traps, the steam pipes, various valves, and the like, are more widely considered to be an asset while giving consideration to the possibility of an incident regarding important devices that constitute an industrial plant caused due to selection of the steam traps (e.g. the case where a temperature adjustment trap is installed as a main pipe), inappropriate attachment of the steam traps, ignoring a steam trap failure, or the like.

Note that the above problem is not limited to the steam utilization facilities but is common to general fluid utilization facilities, and the terms may be replaced with other appropriate terms. For example, "steam" may be replaced with various "fluids", and "steam trap" may be replaced with "drain trap".

In view of the foregoing situation, the present invention mainly aims to provide a fluid utilization facility management method by which the running state of a fluid utilization facility can be optimized, and a fluid utilization facility management system used for this method.

Mechanism for Solving Problem

A fluid utilization facility management method according to the present disclosure includes: monitoring an operating state of a fluid utilization device and an operating state of a drain trap in a fluid utilization facility based on detection information from detectors installed in various places in the fluid utilization facility; and optimizing a running state of the fluid utilization facility based on this monitoring result.

Here is a description of a steam utilization facility that is a kind of fluid utilization facility. In order to optimize the running state of a steam utilization facility, first, it is necessary to clearly ascertain (i.e. visualize) the state of a steam system in the steam utilization facility, and make problems existing in the steam system clear. In particular, regarding problems existing in the steam system, problems relating to the aforementioned optimization points such as the suitability of the models of steam utilization devices (a kind of fluid utilization device) and steam traps (a kind of drain trap), a piping layout, steam-saving, and drainage are unlikely to surface when the steam utilization facility is under construction, and become clear by visualizing the state of steam system after actually starting to run the steam utilization facility.

For the visualization of the state of steam system, the operating states of the steam utilization devices and the steam traps in the steam utilization facility are important. In the steam utilization devices, the state of steam changes due to the steam being used. In the steam traps in the steam utilization facility, the state of steam changes due to drain water in the steam pipes being collected or the steam leaking due to a failure, for example. That is to say, the steam utilization devices and the steam traps in the steam utilization facility are locations where the state of steam changes. If the steam system is in an optimal state, at least the operating states at the locations where the state of steam changes are appropriate, and the change in the state of steam at these locations is ideal. In other words, it is possible to visualize whether the steam system is in an optimal state through the operating states at the locations where the state of steam changes.

For this reason, in the above configuration, the operating states of the steam utilization devices and the operating states of the steam traps, i.e. the operating states at the locations where the state of steam changes are monitored using detectors installed in various places in the steam utilization facility. With the above configuration, it is possible to visualize whether the state of the steam system is optimal based on the monitoring result. By visualizing the steam system, problems existing in the steam system can be made clear, and points to be improved can be made clear. Therefore, the operating state of the steam utilization facility can be optimized.

Such optimization of the running state of the steam utilization facility can contribute to the greatest possible reduction in drainage failure, steam loss, and $CO_2$ emission in the steam system, and construction of a mechanism of asset management for a steam system in an industrial plant that can increase the safety, reliability, and economy of the overall steam system. That is to say, it is possible to consider the overall steam system as one important asset, optimize the steam system in accordance with the rules and principles of steam utilization ((1) drain water generated in a steam system is appropriately and promptly discharged, (2) steam does not leak from the steam system, and (3) the inside of the steam system is always filled with steam), and provide a mechanism for maintaining the same.

The above effect is achieved not only in a steam utilization facility, and the above effect can also be achieved in general fluid utilization facilities by applying the fluid utilization facility management method having the configuration according to the first feature to the general fluid utilization facilities. In this case, the terms may be replaced with other appropriate terms. For example, "steam" may be replaced with various "fluids", and "steam trap" may be replaced with "drain trap".

The following is a description of a preferable mode of the fluid utilization facility management method according to the present disclosure. However, the scope of the present disclosure is not limited by the examples of the following preferable modes.

In an aspect, it is preferable to calculate an energy balance in the fluid utilization facility, and optimize the running state of the fluid utilization facility based on this energy balance calculation result and the monitoring result.

Here is a description of the steam utilization facility that is a kind of fluid utilization facility. The method having the configuration according to the first feature is for achieving visualization at specific locations in the steam system, i.e. in terms of hardware. Meanwhile, in the above configuration, the visualization of the overall steam system is also achieved in terms of energy, i.e. software, by calculating the energy balance in the steam utilization facility. As a result, for example, if the result of monitoring the steam utilization device and the steam trap that are hardware indicates that the running state of the steam utilization facility is in a normal range but a sufficient result cannot be obtained in the calculation of the energy balance that is software, it suggests that there may be some problem in the model or arrangement of the steam utilization device or the steam trap, or in the piping layout. Also, points to be improved for achieving ideal energy balance that is obtained from the result of the calculation of the energy balance that is software can be made clear by using specific information regarding details of the steam utilization facility that is the result of the monitoring of the steam utilization device and the steam trap that is hardware. Thus, by complementarily determining the running state of the steam utilization facility in terms of both hardware and software, the problem and the points to be improved in the steam system can be made clearer, and the operating state of the steam utilization facility can be effectively optimized.

The above effect is achieved not only in a steam utilization facility, and the above effect can also be achieved in general fluid utilization facilities by applying the above fluid utilization facility management method to the general fluid utilization facilities. In this case, the terms may be replaced with other appropriate terms. For example, "steam" may be replaced with various "fluids", and "steam trap" may be replaced with "drain trap".

In an aspect, it is preferable to make a trial calculation of an economic effect or an environmental effect achieved in a case of optimizing the running state of the fluid utilization facility from a current state.

That is to say, the aforementioned methods are for achieving the visualization in terms of the operating state of the device and for achieving the visualization also from the aspect of energy balance, and it is difficult with either method to ascertain the advantages and disadvantages or the value of optimization at a glance. Meanwhile, with the above configuration, the visualization of the steam system is achieved in the form of the economic effect or the environmental effect such that the advantages and disadvantages and the value of the optimization can be easily ascertained. Therefore, the running state of the fluid utilization facility can be more effectively optimized.

In an aspect, it is preferable that the fluid utilization facility is a steam utilization facility that uses steam as a fluid, and the energy balance includes a steam balance calculated based on a steam use status of the steam utilization facility.

That is to say, with the above configuration, in the steam utilization facility that is a kind of fluid utilization facility, the calculated energy balance includes the steam balance that is based on the steam use status (i.e. the balance regarding the location where the steam is generated and the amount of generated steam, and the location where the steam is used and the amount of used steam in the steam utilization facility). Therefore, for example, it is possible to ascertain the running status of the steam utilization facility from the viewpoint of steam-saving (and furthermore, the viewpoint of a reduction in $CO_2$ emission as a result thereof), such as in terms of the amount of steam loss existing in the steam system in the steam utilization facility, and a method for reducing the loss, and the amount of reducible loss with this method. Thus, the running state of the steam utilization facility can be more effectively optimized.

In an aspect, it is preferable that the fluid utilization facility is a steam utilization facility that uses steam as a fluid, a steam utilization device that is the fluid utilization device in the steam utilization facility includes a generator that generates electric power using steam, and the energy balance includes a balance between heat and electric power calculated based on a total amount of generated steam and an amount of electric power generated by the generator in the steam utilization facility.

That is to say, with the above configuration, in a steam utilization facility that is a kind of fluid utilization facility and runs using self-generated electric power, the calculated energy balance includes the balance between heat and electric power (i.e. the balance of the amount of steam (heat) used for electric power generation out of the total amount of generated steam). Therefore, for example, the running status of the steam utilization facility can be ascertained from the optimal balance between heat and electric power in the steam utilization facility obtained while giving consideration to a change in the cost required for steam generation due to a change in the unit cost of fuel or the like, and a change in the electric energy and the price to purchase power. Thus, the running state of the steam utilization facility can be more effectively optimized.

In an aspect, it is preferable that the fluid utilization facility is a steam utilization facility that uses steam as a fluid, a steam utilization device that is the fluid utilization device in the steam utilization facility includes a fuel device that refines fuel that is also used for steam generation, and the energy balance includes a fuel balance calculated based on an amount of fuel refined by the fuel device and an amount of fuel used for steam generation.

That is to say, with the above configuration, in a steam utilization facility that is a kind of fluid utilization facility, such as a petrochemical plant, and uses, for steam generation, a part of fuel which is in a shippable state as a product, the calculated energy balance includes the fuel balance (i.e. the balance between the amount of generated fuel that is used for running the steam utilization facility and the amount that is shipped). Therefore, for example, the running status of the steam utilization facility can be ascertained from the balance between the shipping amount and the sales of fuel with respect to the running status, such as the steam use status, of the steam utilization facility. Thus, the running state of the steam utilization facility can be more effectively optimized.

In particular, by combining this method with a method in which the steam balance is included in the energy balance, it is possible to simultaneously ascertain the steam-saving effect in the steam utilization facility and the effect of an increase in the shipping amount and the sales of fuel due to a reduction in the amount of fuel used for steam generation as a result of the steam-saving. Thus, the running state of the steam utilization facility can be more effectively optimized.

In an aspect, it is preferable that an energy balance calculation result includes comparison information regarding a comparison between the calculated energy balance and a past energy balance or a reference energy balance.

That is to say, with the above configuration, it is possible to ascertain the degree by which the calculated energy balance is better or worse than the past or reference energy balance. Thus, the running state of the fluid utilization facility can be more effectively optimized.

In an aspect, it is preferable that an operating state of a valve is monitored in addition to the operating state of the fluid utilization device and the operating state of the drain trap, and the monitoring result includes the operating state of the valve.

Here is a description of a steam utilization facility that is a kind of fluid utilization facility. In the steam utilization facility, a valve is for controlling, by being operated, the inflow and the flow rate of steam to the steam utilization device and the steam trap, and closely relates to the operating states of the steam utilization device and the steam trap. Since the valve is also a location where steam is controlled, the state of the steam may change at this location. Furthermore, the valve is also arranged on a drain pipe for discharging drain water generated in the steam utilization facility, and is also for controlling the flow of the drain water. That is to say, with the above configuration, the operating state of the valve that closely relates to the operating states of the steam utilization device and the steam trap and the discharge of the drain water and is a location where the state of the steam may change is monitored, and the operating state of the valve is included in the monitoring result. Therefore, the steam system can be more specifically visualized. For example, the operating state of the steam utilization device and the operating state of the steam trap can be more specifically ascertained. Thus, the running state of the steam utilization facility can be more effectively optimized.

The above effect is achieved not only in a steam utilization facility, but can also be achieved in general fluid utilization facilities by applying this fluid utilization facility management method to the general fluid utilization facilities. In this case, the terms may be replaced with other appropriate terms. For example, "steam" may be replaced with various "fluids", and "steam trap" may be replaced with "drain trap".

In an aspect, it is preferable to create a drain water discharge database including a piping layout of pipes on which the drain trap and the valve are arranged, and models and the operating states of the drain trap and the valve, wherein the monitoring result includes information in the drain water discharge database.

Here is a description of a steam utilization facility that is a kind of fluid utilization facility. Regarding the steam utilization facility, as mentioned above, one of the points for optimizing the running state of the steam utilization facility is that drain water is appropriately discharged. The discharge of drain water closely relates to not only a steam trap that collects drain water but also a valve that controls the inflow and the flow rate of steam to this steam trap and a valve that is arranged on the drain pipe and controls the flow of the drain water. Furthermore, for smooth and efficient discharge of drain water, information whether the piping layout of the pipes on which the steam trap and the valve are arranged is appropriate is essential. With the above configuration, the drain water discharge database including the piping layout of the pipes on which the steam trap and the valve associated with collection and discharge of drain water are arranged and information regarding drain water discharge such as the models and the operating states of the steam trap and the valve are included in the monitoring result. Therefore, the steam system can be visualized in terms of collection and discharge of drain water, and thus, the running state of the steam utilization facility can be more effectively optimized particularly from the viewpoint of smooth and efficient collection and discharge of drain water.

The above effect is achieved not only in a steam utilization facility, but can also be achieved in fluid utilization facilities across the board by applying this fluid utilization facility management method to the general fluid utilization facilities. In this case, the terms may be replaced with other appropriate terms. For example, "steam" may be replaced with various "fluids", and "steam trap" may be replaced with "drain trap".

In an aspect, it is preferable to update the drain water discharge database based on the monitoring result, wherein the monitoring result includes information in the updated drain water discharge database.

That is to say, with the above configuration, the running state of the fluid utilization facility can be more effectively optimized based on the monitoring result that includes the information in the latest drain water discharge database in the fluid utilization facility.

A fluid utilization facility management system for implementing the above fluid utilization facility management method according to the present disclosure includes: detectors arranged in various places in the fluid utilization facility; and a management means that includes a monitoring unit for monitoring the operating state of the fluid utilization device and the operating state of the drain trap in the fluid utilization facility based on the detection information, and a simulation unit for simulating the energy balance in the fluid utilization facility.

That is to say, with the above configuration, the above fluid utilization facility management method can be preferably implemented, and thus, the aforementioned effects achieved by the above fluid utilization facility management method can be effectively achieved.

The following is a description of a preferable mode of the fluid utilization facility management system according to the present disclosure. However, the scope of the present disclosure is not limited by the examples of the following exemplary preferable modes.

In an aspect, it is preferable that the monitoring unit monitors an operating state of a valve in addition to the operating state of the fluid utilization device and the operating state of the drain trap.

In an aspect, it is preferable that the management means includes a storage unit that stores a drain water discharge database including a piping layout of fluid pipes on which the drain trap and the valve are arranged, a model of the drain trap, and the operating states of the drain trap and the valve.

In an aspect, it is preferable that the monitoring unit the monitoring unit updates the drain water discharge database based on the monitoring result.

BRIEF DESCRIPTION OF THE DRAWINGS

FIG. 14 is an illustrative diagram of an output image in which improvement ideas are listed.

DESCRIPTION OF THE INVENTION

Figure 1:
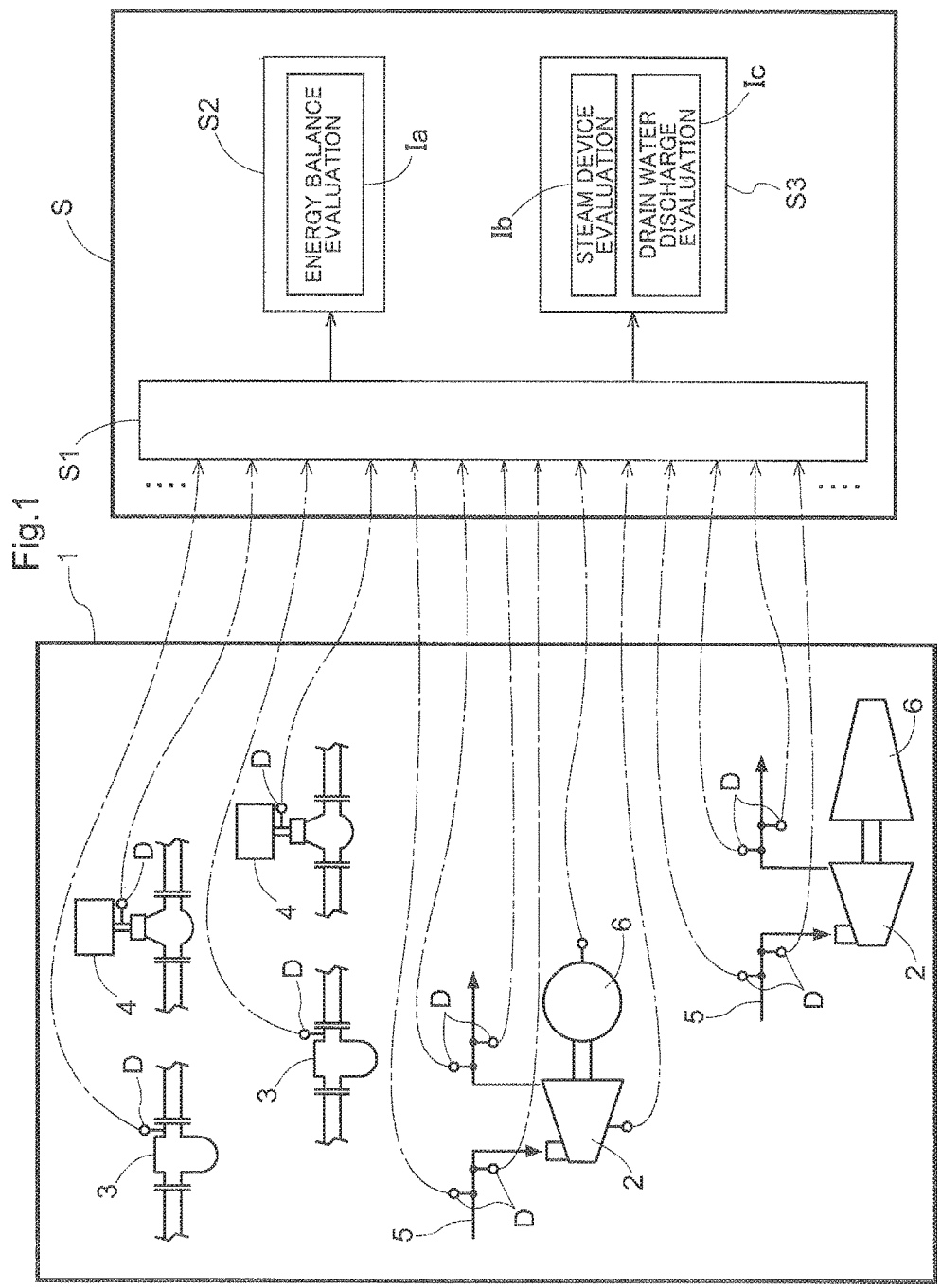
FIG. 1 is a schematic diagram of optimization of a running state of a steam utilization facility according to the present disclosure.

FIG. 1 shows the outline of a method for optimizing a running state of a steam utilization facility (Steam Application: SA), which is a kind of fluid utilization facility that uses a fluid utilization facility management system according to the present disclosure. A steam utilization facility 1 that optimizes the running state is mainly constituted by steam utilization devices (a kind of fluid utilization device) 2, steam traps 3 (a kind of drain trap), valves 4, steam pipes 5, and sub-devices 6 (devices that operate in association with operation of the steam utilization devices 2, devices that assist the operation of the steam utilization devices 2, etc.). A fluid utilization facility management system according to the present disclosure is mainly constituted by detectors D that are arranged in various places in the steam utilization facility 1 including the steam utilization devices 2, the steam traps 3, the valves 4, the steam pipes 5, the sub-devices 6, and other places that are not shown in the diagram, and a management means S that includes a data input unit S1 that acquires detection information transmitted from the detectors D, a simulation unit S2 that simulates energy balance in the steam utilization facility 1 based on the acquired detection information, and a monitoring unit S3 that monitors an operating state of the steam utilization devices 2 and an operating state of the steam traps 3 in the steam utilization facility 1 based on the acquired detection information.

The detectors D are configured to be able to transmit the detected detection information to the management means S, by means of communication. In this steam utilization facility monitoring system, the detection information regarding various places in the steam utilization facility 1 is transmitted to the management means S by the detectors D, and the information regarding the overall steam utilization facility 1 is collectively managed by the management means S.

The management means S acquires, with the data input unit S1, the detection information regarding various places in the steam utilization facility 1 transmitted from the detectors D. Based on the acquired detection information regarding various places in the steam utilization facility 1, the simulation unit S2 calculates the current energy balance in the steam utilization facility 1 and generates energy balance evaluation information Ia as a result of this calculation. The monitoring unit S3 generates device evaluation information Ib regarding running efficiency and abnormal operation in the steam utilization devices 2 as a result of the monitoring of the operating states of the steam utilization devices 2, and generates drain water discharge evaluation information Ic regarding steam leakage and abnormality in drain water discharge at locations associated with drain water discharge (hereinafter referred to as drain water discharge locations), such as the steam traps 3, as a result of monitoring the operating states of the steam traps 3.

Here is a detailed description. The energy balance evaluation information Ia includes evaluation information regarding various kinds of energy balances, such as a steam balance based on the steam use status of the steam utilization facility 1 (i.e. a balance regarding the locations where steam is generated and the amount of generated steam, and the locations where steam is used and the amount of used steam in the steam utilization facility), a balance between heat and electric power based on the total amount of generated steam and the amount of electric power generated by a generator in the steam utilization facility 1 (i.e. a balance regarding the amount of steam that is used for electric power generation in the total amount of generated steam) in the case of having a generator that generates electric power using steam, and a fuel balance based on the amount of fuel refined in the steam utilization facility 1 and the amount of fuel that is used for steam generation in the steam utilization facility 1 (i.e. a balance regarding the amounts of generated fuel that is used for running the steam utilization facility and that is shipped) in the case of including a fuel device that refines fuel. Thus, the steam system is visualized in terms of various kinds of energy.

The monitoring of the operating states of the steam utilization devices 2 by the monitoring unit S3 is based on not only the detection information regarding the steam utilization device 2 to be monitored, but also the detection information regarding steam controllers that control the state of steam entering and exiting the target steam utilization device 2 (e.g. the steam traps 2 that collect drain water such as condensate water in steam, the valves 3 that control the flowing direction and the flow rate of steam in the steam pipes etc.), the detection information regarding the steam pipes 5 that are attached to the target steam utilization device 2, and the detection information regarding the sub-device 6 that is attached to the steam utilization device 2. The operating states of the steam utilization devices 2 are monitored based on various monitoring items for each piece of the above detection information or preset specific combinations thereof.

Thus, the operating states of the steam utilization devices 2 are comprehensively monitored by the monitoring unit S3 based on not only the detection information regarding the steam utilization devices 2 but also the information regarding every device associated with the operation of these steam utilization devices 2. Based on a great amount of information, appropriateness or an abnormality in the operating states of the steam utilization devices 2 can be accurately observed.

In particular, with the detection information regarding the steam controllers, it can be estimated whether the steam entering and exiting the steam utilization devices 2 is appropriate (in terms of the temperature thereof, the amount of drain water etc.) and whether the steam is appropriately passing through the steam utilization devices 2. Thus, it can be determined whether the steam utilization devices 2 can be operated without any problem or there is no concern about the occurrence of a malfunction if the steam utilization devices 2 continue to be operated as-is, and the appropriateness of the operating states of the steam utilization devices 2 including the possibility of the occurrence of an abnormality in the future can be accurately evaluated. By observing an abnormality in a steam controller that occurs at a stage prior to the occurrence of a malfunction in the steam utilization devices 2, a sign of an abnormality in the steam utilization devices 2 can be observed at an early stage.

As a result of such monitoring of the operating states of the steam utilization devices 2, the monitoring unit S3 generates the steam device evaluation information Ib, and visualizes the steam system in terms of the operating states of the steam utilization devices 2 that include a sign of an abnormality in the steam utilization devices 2 and the possibility of the occurrence of an abnormality in the future.

In the monitoring of the operating states of the steam traps 3 by the monitoring unit S3, the operating states of the valves 4 are also monitored based on the detection information when necessary, and the drain water discharge evaluation information Ic is generated as a result of the monitoring including the operating states of the valves 4. Furthermore, a drain water discharge database including the piping layout of the pipes 5 on which the steam traps 3 and the valves 4 are arranged and the information associated with drain water discharge such as the models and the operating states of the steam traps 3 and the valves 4 is created in advance. The monitoring unit S3 updates this drain water discharge database based on the acquired detection information regarding various places in the steam utilization facility 1, and includes the updated drain water discharge database in the drain water discharge evaluation information Ic.

With this drain water discharge evaluation information Ic, the steam system is visualized in terms of drain water discharge including the operating states of the steam traps 3.

The management means S visualizes the steam system from these three viewpoints, namely the energy balance evaluation information Ia, the steam device evaluation information Ib, and the drain water discharge evaluation information Ic. An administrator in charge of the steam utilization facility P can make clear problems and points to be improved in the steam system by complementarily determining the above evaluation information Ia to Ic, and optimize the running state of the steam utilization facility.

Note that the above fluid utilization facility management system is applicable to general fluid utilization facilities. In this case, in the above embodiment, the terms may be replaced with other appropriate terms. For example, "steam" may be replaced with various "fluids", and "steam trap" may be replaced with "drain trap".

Next, as a more specific example, an example in which this fluid utilization facility management system is applied to a steam utilization facility P that is a petrochemical plant will be described.

Figure 2:
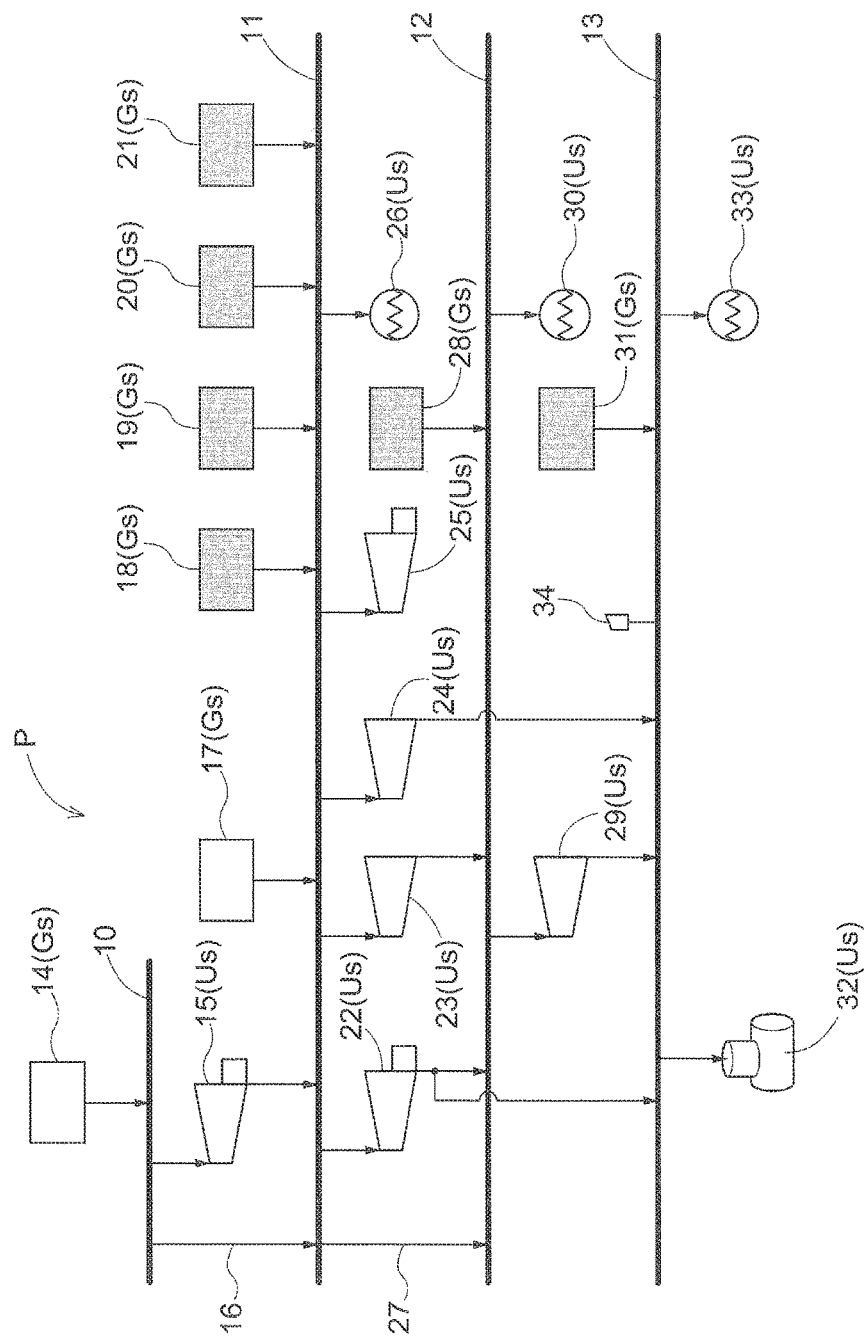
FIG. 2 is a schematic diagram of an overall configuration of a steam piping system in the steam utilization facility.

FIG. 2 is a schematic diagram of an overall configuration of a steam piping system in the steam utilization facility P. The steam piping system in this steam utilization facility P is mainly constituted by four steam pipes 10 to 13 for feeding steam of different pressures, steam generation devices Gs, and steam utilization devices Us. In this steam utilization facility P, the steam generated by the steam generation devices Gs is supplied to the various steam utilization devices Us through the respective steam pipes 10 to 13 and is used for various kinds of applications.

Here is a detailed description of the steam pipes 10 to 13. The steam pipe 10 is a high-pressure steam pipe that feeds high-pressure steam (in this embodiment, 12000 kPa(G)). The steam pipe 11 is a middle/high-pressure steam pipe that feeds middle/high-pressure steam (in this embodiment, 4000 kPa(G)). The steam pipe 12 is a middle-pressure steam pipe that feeds middle-pressure steam (in this embodiment, 1000 kPa(G)). The steam pipe 13 is a low-pressure steam pipe that feeds low-pressure steam (in this embodiment, 140 kPa(G)).

High-pressure steam is supplied to the high-pressure steam pipe 10 from a first boiler 14, which is a steam generation device Gs. The first boiler 14 generates steam using both fuel gas and fuel A (e.g. oil or coal). The ratio between the fuel gas and the fuel A used for steam generation by the first boiler 14 changes as appropriate in accordance with the amount of generated steam, the running status of the steam utilization facility, and the like.

The high-pressure steam supplied to the high-pressure steam pipe 10 is supplied to a first turbine generator 15, which is a steam utilization device Us that is connected to the high-pressure steam pipe 10, and is used therein. The high-pressure steam supplied from the high-pressure steam pipe 10 to the first turbine generator 15 is subjected to pressure reduction into middle/high-pressure steam by being used for electric power generation by the first turbine generator 15, and is thereafter supplied to the middle/high-pressure steam pipe 11.

The high-pressure steam pipe 10 is also connected to a first pressure reduction supply path 16 that reduces the pressure of the high-pressure steam in the high-pressure steam pipe 10 and supplies middle/high-pressure steam to the middle/high-pressure steam pipe 11. Some of the steam in the high-pressure steam pipe 10 is supplied to the middle/high-pressure steam pipe 11 as appropriate due to an open/close operation made to a control valve (not shown) that is mounted in this first pressure reduction supply path 16.

Middle/high-pressure steam is supplied to the middle/high-pressure steam pipe 11 from the first turbine generator 15, the first pressure reduction supply path 16, and a second boiler 17 and waste heat boilers 18 to 21, which are steam generation devices Gs. The second boiler 17 generates steam using fuel gas. The waste heat boilers 18 to 21 (and later-described waste heat boilers 28 and 31) generate steam using waste heat generated as a result of running the steam utilization facility P (e.g. running later-described combustion furnaces). That is to say, the waste heat boilers 18 to 21 (and the later-described waste heat boilers 28 and 31) substantially do not require fuel for steam generation.

The middle/high-pressure steam supplied to the middle/high-pressure steam pipe 11 is supplied to a second turbine generator 22, a first middle/high-pressure turbine 23, a second middle/high-pressure turbine 24, a third middle/high-pressure turbine 25, and a heat exchanger 26, which are steam utilization devices Us that are connected to the middle/high-pressure steam pipe 11, and is used therein.

The middle/high-pressure steam supplied from the middle/high-pressure steam pipe 11 to the second turbine generator 22 is subjected to pressure reduction into middle-pressure steam or low-pressure steam by being used for electric power generation by the second turbine generator 22, and is thereafter supplied to the middle-pressure steam pipe 12 or the low-pressure steam pipe 13. The middle/high-pressure steam supplied from the middle/high-pressure steam pipe 11 to the first middle/high-pressure turbine 23 is subjected to pressure reduction into middle-pressure steam by being used by the first middle/high-pressure turbine 23, and is thereafter supplied to the middle-pressure steam pipe 12. The middle/high-pressure steam supplied from the middle/high-pressure steam pipe 11 to the second middle/high-pressure turbine 24 is subjected to pressure reduction into low-pressure steam by being used by the second middle/high-pressure turbine 24, and is thereafter supplied to the low-pressure steam pipe 13.

The middle/high-pressure steam pipe 11 is connected to a second pressure reduction supply path 27 that reduces the pressure of the middle/high-pressure steam in the middle/high-pressure steam pipe 11 and supplies middle-pressure steam to the middle-pressure steam pipe 12. A part of the steam in the middle/high-pressure steam pipe 11 is supplied to the middle-pressure steam pipe 12 as appropriate due to an open/close operation made to a control valve (not shown) that is mounted in this second pressure reduction supply path 27.

Middle-pressure steam is supplied to the middle-pressure steam pipe 12 through the second turbine generator 22, the first middle/high-pressure turbine 23, the second pressure reduction supply path 27, and the waste heat boiler 28, which is a steam generation device Gs.

The middle-pressure steam supplied to the middle-pressure steam pipe 12 is supplied to a middle-pressure turbine 29 and a heat exchanger 30, which are steam utilization devices Us connected to the middle-pressure steam pipe 12, and is used therein. The middle-pressure steam supplied from the middle-pressure steam pipe 12 to the middle-pressure turbine 29 is subjected to pressure reduction into low-pressure steam by being used by the middle-pressure turbine 29, and is supplied to the low-pressure steam pipe 13.

Low-pressure steam is supplied to the low-pressure steam pipe 13 through the second turbine generator 22, the second middle/high-pressure turbine 24, the middle-pressure turbine 29, and the waste heat boiler 31, which is a steam generation device Gs.

The low-pressure steam supplied to the low-pressure steam pipe 13 is supplied to a deaerator 32 and a heat exchanger 33, which are steam utilization devices Us, and is used therein. In the deaerator 32, water that is to be supplied as a steam source to the first boiler 14, the second boiler 17, and the waste heat boilers 18 to 21, 28, and 31 is deaerated by heating the water using the low-pressure steam supplied from the low-pressure steam pipe 13. Redundant low-pressure steam in the low-pressure steam pipe 13 is released as unnecessary steam to the outside of the system through a vent pipe 34.

Thus, the steam utilization facility P has a configuration in which the steam generated by the steam generation devices Gs is used by the steam utilization devices Us, and thereafter is sequentially reused by the steam utilization devices Us connected to lower-pressure steam pipes.

Each part of the steam piping system in the steam utilization facility P is provided with various detectors D (not shown) that detect information (flow rate, pressure, and temperature etc.) regarding steam that passes through a corresponding part, and information regarding the amount of steam generated by the steam generation devices Gs, the amount of steam used by the steam utilization devices Us, the amount of electric power generated by the first and second turbine generators 15 and 22, and the like, and transmit the information to the management means S. The information detected by these detectors D is transmitted to the management means S. Note that various kinds of information may be collected through inspection performed by an inspector, and the inspector may input various kinds of information to the management means S in accordance with the installation location of the devices, and the importance of monitoring of the information detected by the devices.

Note that FIG. 2 is merely a schematic diagram, where the number of each of the devices 10 to 34 is only one. However, it does not necessarily mean that the number of each of the devices 10 to 34 provided in the steam piping system in the steam utilization facility P is only one. For example, in FIG. 2, only one first turbine generator 15 is shown. However, this does not indicate that only one first turbine generator 15 is provided in the overall steam utilization facility P, but includes the case where a plurality of first turbine generators 15 provided in the overall steam utilization facility P is collectively shown as one first turbine generator 15 for the sake of simplification. This also applies to the other devices 10 to 34.

Figure 3:
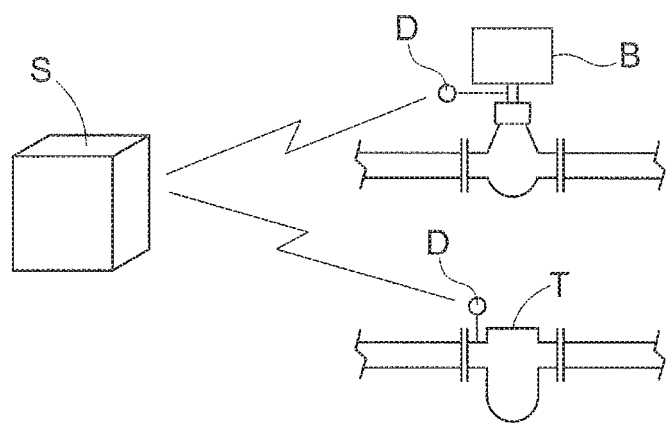
FIG. 3 is a diagram showing a steam trap and valves in the steam utilization facility.

As shown in FIG. 3, a large number of steam traps T and valves B are arranged in a dispersed manner on each part of the steam piping system in the steam utilization facility P. A detector D that is provided with a sensor for detecting a device state and that transmits detected device state information (temperature, vibration etc.) together with position information and installed device model information to the management means S is mounted on each of the steam traps T and the valves B that are set to be monitoring targets. Thus, the device state information regarding the steam traps T and the valves B that are monitoring targets is accumulated in the management means S, and the state at drain water discharge locations (the steam traps T and the valves B) can be constantly or regularly monitored by the management means S.

Note that the detectors D may not be directly mounted in the steam traps T and the valves B, but may be mounted near them to indirectly detect the device state information (temperature, vibration etc.) of the steam traps T and the valves B that are monitoring targets.

Depending on the installation environment at the drain water discharge locations such as the installation locations and the importance of monitoring of the drain water discharge locations, the detectors D may not be used, and an inspector may collect the device state information at the drain water discharge locations (the steam traps T and the valves B) using a portable detector, and input the collected device state information to the management means S. In this case, in this steam utilization facility P, the drain water discharge locations may be classified into locations where the device state information is collected by the detectors D and locations where the device state information is collected through inspection performed by an inspector, in accordance with conditions such as the installation environment and the importance of monitoring of the drain water discharge locations.

Figure 4:
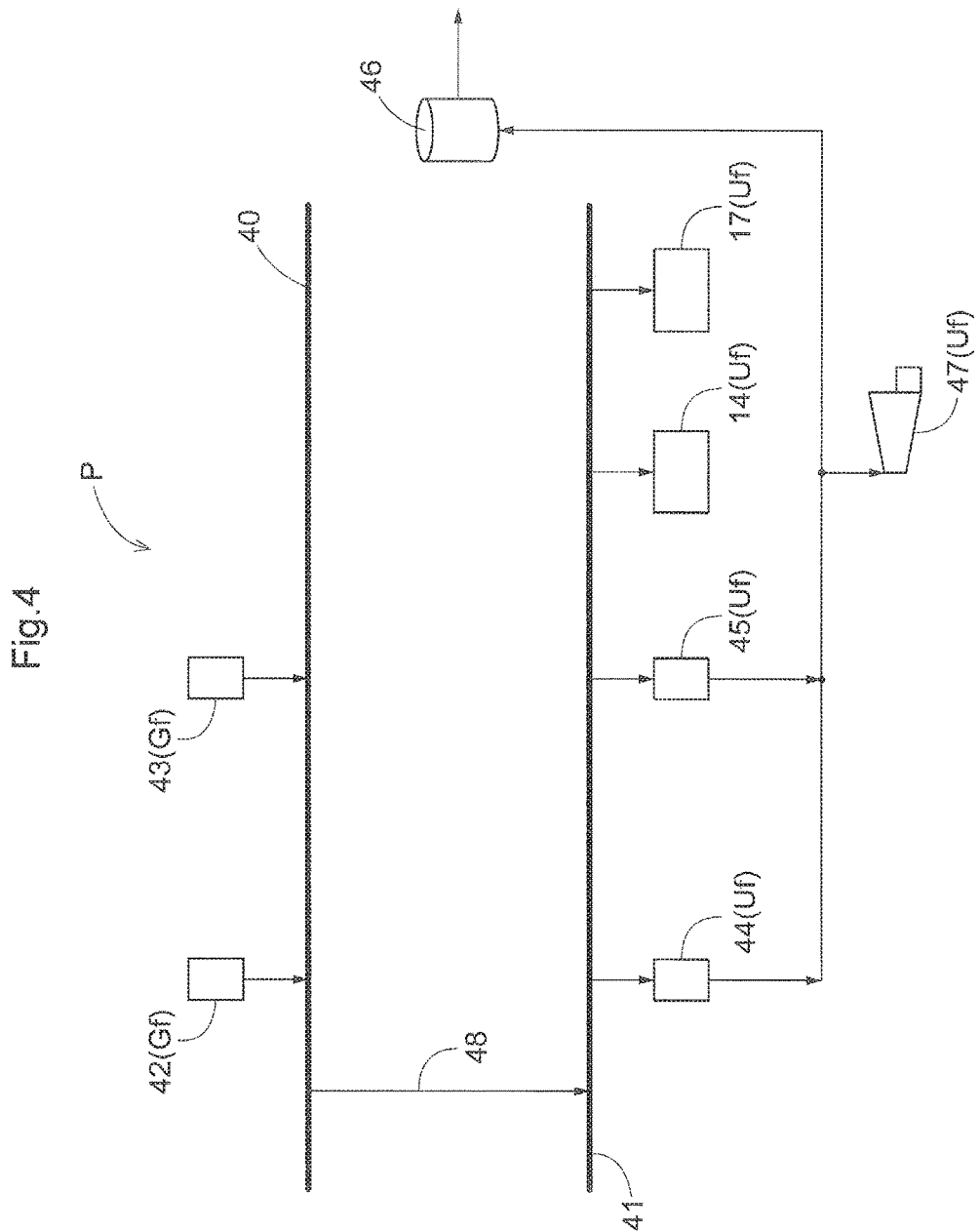
FIG. 4 is a schematic diagram of an overall configuration of a fuel piping system in the steam utilization facility.

FIG. 4 shows a partial configuration of a fuel piping system in the steam utilization facility P. The fuel piping system in this steam utilization facility P is constituted by two fuel gas pipes 40 and 41, combustion furnaces 42 to 45, the aforementioned first and second boilers 14 and 17, a fuel tank 46 that stores liquid fuel of C4 fraction, a gas turbine 47 to which the fuel of C4 fraction is supplied, and the like. In the following description, a device that supplies fuel gas to the fuel gas pipes 40 and 41 will be referred to as a fuel gas generation device Gf, and a device that receives the supply of the fuel gas from the fuel gas pipes 40 and 41 will be referred to as a fuel gas utilization device Uf.

Here is a detailed description of the fuel gas pipes 40 and 41. The fuel gas pipe 40 is a high-pressure gas pipe for transporting high-pressure fuel gas, and the fuel gas pipe 41 is a low-pressure gas pipe for transporting low-pressure fuel gas.

The high-pressure fuel gas supplied from the combustion furnaces 42 and 43, which are fuel gas generation devices Gf, is transported to a transportation destination that is not shown, through the high-pressure gas pipe 40. The high-pressure gas pipe 40 is connected to a supply path 48 that reduces the pressure of the high-pressure fuel gas in the high-pressure gas pipe 40 and supplies low-pressure fuel gas to the low-pressure gas pipe 41. The fuel gas in the high-pressure gas pipe 40 is supplied to the low-pressure gas pipe 31 as appropriate due to an open/close operation made to a control valve (not shown) that is disposed on this supply path 48.

The low-pressure fuel gas supplied from the supply path 48 is transported to a transportation destination that is not shown, through the low-pressure gas pipe 41, and a part of the transported low-pressure fuel gas is supplied to the combustion furnaces 44 and 45, which are fuel gas utilization devices Uf, and the aforementioned first and second boilers 14 and 17. The combustion furnaces 44 and 45 to which the fuel gas is supplied generates the fuel of C4 fraction, the generated fuel of C4 fraction is stored in the fuel tank 46, and a part of the generated fuel is supplied to the gas turbine 47, which is a fuel gas utilization device Uf, as necessary. The first and second boilers 14 and 17 generate steam using the supplied fuel gas. As mentioned above, the fuel A (not shown) that is different from fuel gas is also supplied to the first boiler 14.

Each part of the fuel piping system in the steam utilization facility P is provided with a detector D (not shown) that detects information (flow rate, pressure, temperature etc.) regarding fuel gas flowing through a corresponding part, and information regarding the amount of fuel gas generated by the fuel gas generation devices Gf, the amount of fuel used by the fuel gas utilization devices Uf, the amount of liquid fuel stored in the fuel tank, and the like, and transmits the detected information together with position information, model information, and the like to the management means S. The information detected by this detector D is transmitted to the management means S. Note that various kinds of information may be collected through inspection performed by an inspector, and the inspector may input various kinds of information to the management means S in accordance with the installation location of the devices, and the importance of monitoring of the detected information regarding the devices.

Note that, similar to FIG. 3, the number of each of the devices 14, 17, and 40 to 48 shown in FIG. 4 is only one. However, it does not necessarily mean that the number of each of the devices 14, 17, and 40 to 48 provided in the fuel piping system in the steam utilization facility P is only one. FIG. 4 also shows the case where a plurality of respective devices 14, 17, and 40 to 48 provided in the overall steam utilization facility P are collectively shown as one device for the sake of simplification.

Next, an example of usage of the steam utilization devices in this steam utilization facility P and a configuration of the steam utilization devices and the periphery thereof will be described.

Figure 5:
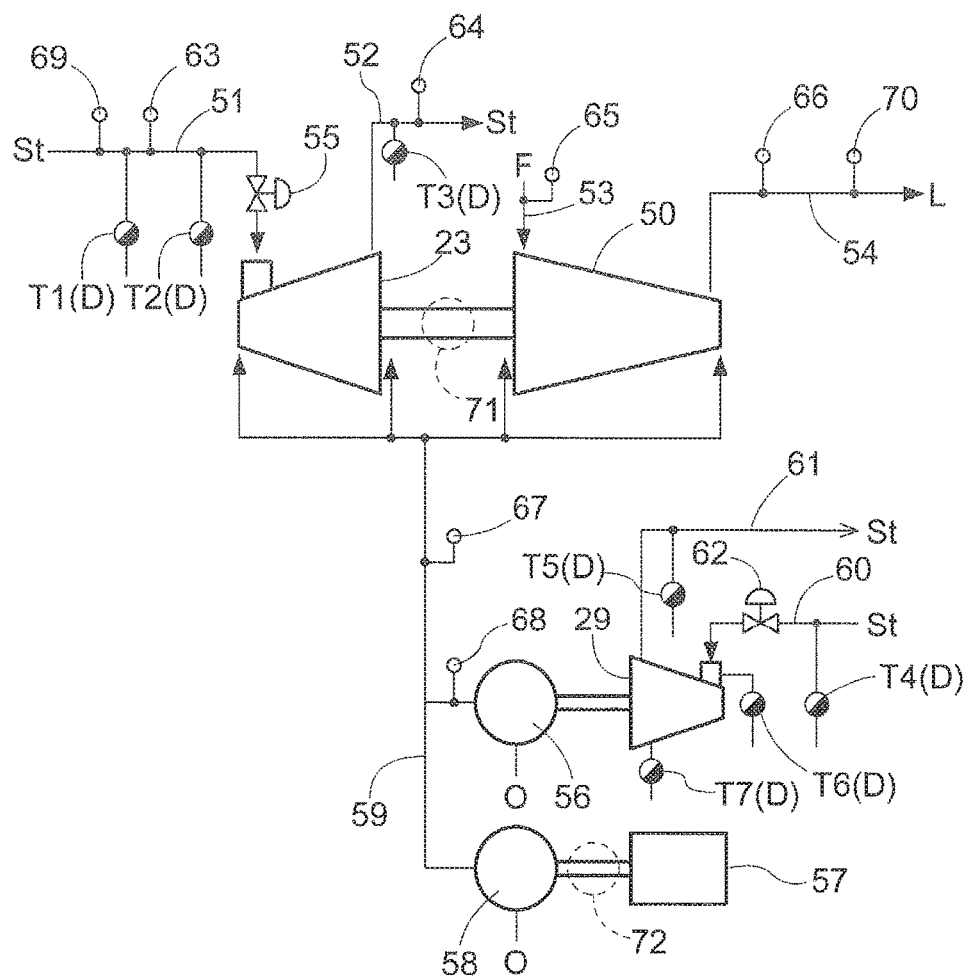
FIG. 5 is a configuration diagram of the periphery of a first middle/high-pressure turbine in the steam utilization facility.

For example, FIG. 5 is a configuration diagram showing the first middle/high-pressure turbine 23 and the periphery thereof for illustrating a usage of the first middle/high-pressure turbine 23, which serves as a steam utilization device. Liquid fuel is generated in the periphery of this first middle/high-pressure turbine 23.

Here is a detailed description. The first middle/high-pressure turbine 23 is connected to a compressor 50, and the compressor 50 is driven by steam St supplied from a steam entrance path 51, which is in communication with the middle/high-pressure steam pipe 11, to the first middle/high-pressure turbine 23. Fuel gas F that is supplied from a fuel gas supply path 53 to the compressor 50 is compressed as a result of the compressor 50 so being driven, to generate liquid fuel L. The generated liquid fuel L is discharged through a liquid fuel supply path 54. The steam St supplied from the steam entrance path 51 to the first middle/high-pressure turbine 23 is discharged through a steam exit path 52, which is in communication with the middle-pressure steam pipe 12. The amount of steam St supplied to the first middle/high-pressure turbine 23 is configured to be adjustable using an adjustment valve 55.

The first middle/high-pressure turbine 23 and the compressor 50 are connected to a turbine pump 56, which is connected to the aforementioned middle-pressure turbine 29, and a motor pump 58, which is driven by a motor 57, via a lubricating oil supply path 59. The turbine pump 56 is driven by the steam St supplied to the middle-pressure turbine 29 from a steam entrance path 60, which is in communication with the middle-pressure steam pipe 12. The steam St supplied from the steam entrance path 60 to the middle-pressure turbine 29 is discharged through a steam exit path 61, which is in communication with the middle-pressure steam pipe 12. By driving these turbine pump 56 and motor pump 58, the first middle/high-pressure turbine 23 and the compressor 50 are supplied with lubricating oil O. As a result of the lubricating oil O being stably supplied, the first middle/high-pressure turbine 23 and the compressor 50 are smoothly driven.

Essentially, the lubricating oil O is supplied to the first middle/high-pressure turbine 23 and the compressor 50 by the motor pump 58. If the supply pressure of the lubricating oil O becomes smaller than or equal to a set value, the lubricating oil O is also supplied by the turbine pump 56. For this reason, if the supply pressure of the lubricating oil O becomes smaller than or equal to the set value, the steam St of an amount required to cause the turbine pump 56 to perform a given operation is supplied to the middle-pressure turbine 29 by adjusting the adjustment valve 62. Note that, even when the lubricating oil O is supplied only by the motor pump 58, the steam St of an amount for performing a slow roll operation for warming-up is supplied to the middle-pressure turbine 29 by adjusting the adjustment valve 62.

Steam traps T (T1 to T7) are arranged on the steam entrance path 51 and the steam exit path 52 of the first middle/high-pressure turbine 23, the steam entrance path 60 and the steam exit path 61 of the middle-pressure turbine 29, and the middle-pressure turbine 29. With each steam trap T as a monitoring target, the device state information (temperature, vibration etc.) regarding the steam trap T is detected by the aforementioned detector D and transmitted to the management means S.

Manometers 63 to 68, which serve as detectors D, are mounted on the steam entrance path 51 and the steam exit path 52 of the first middle/high-pressure turbine 23, the fuel gas supply path 53 and the liquid fuel supply path 54 of the compressor 50, and the lubricating oil supply path 59, and detect the pressure of fluid that flows through respective places. Flowmeters 69 and 70, which serve as detectors D, are mounted on the steam entrance path 51 of the first middle/high-pressure turbine 23 and the liquid fuel supply path 54 of the compressor 50, and the flow rate of the steam St or the liquid fuel L is detected. The number of revolutions of the first middle/high-pressure turbine 23 is measured by a tachometer 71, which serves as a detector D and is connected to the first middle/high-pressure turbine 23. A temperature/vibration sensor 72, which serves as a detector D, is mounted on the motor 58, and detects the temperature and vibration of the motor 58. Various kinds of information detected by the manometers 63 to 68, the flowmeters 69 and 70, the tachometer 71, and the temperature/vibration sensor 72 are transmitted to the management system S.

Figure 6:
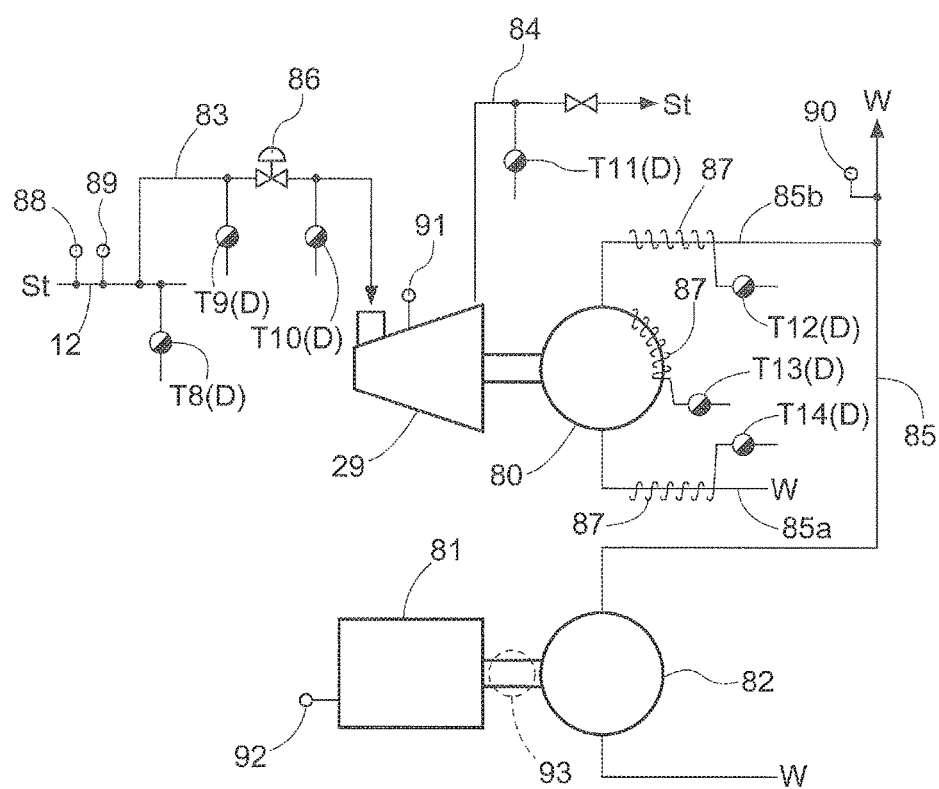
FIG. 6 is a configuration diagram of the periphery of a middle-pressure turbine in the steam utilization facility.

Similarly, as an example of usage of the steam utilization devices Us in the steam utilization facility P and a configuration of the steam utilization device Us and the periphery thereof, FIG. 6 shows a configuration diagram of the middle-pressure turbine 29, which serves as a steam utilization device Us, and the periphery thereof. FIG. 6 shows a middle-pressure turbine 29 that is different from the middle-pressure turbine 29 shown in FIG. 5 and has a different usage from that of the middle-pressure turbine 29 in FIG. 5. Water for steam generation is supplied to the waste heat boilers 18 to 21, 28, and 31 in the periphery of this middle-pressure turbine 29.

Here is a detailed description. The periphery of the middle-pressure turbine 29 includes a turbine pump 80, which is connected to the middle-pressure turbine 29, and a motor pump 82, which is driven by a motor 81. The turbine pump 80 is driven by the steam St supplied to the middle-pressure turbine 29 from a steam entrance path 83, which is in communication with the middle-pressure steam pipe 12. By driving these turbine pump 80 and motor pump 82, water W for steam generation is supplied to the waste heat boilers 18 to 21, 28, and 31 through a water supply path 85. The steam St supplied from the steam entrance path 83 to the middle-pressure turbine 29 is discharged through a steam exit path 84, which is in communication with the low-pressure steam pipe 13. The amount of steam St supplied to the middle-pressure turbine 29 is configured to be adjustable using an adjustment valve 86.

Essentially, the water W for steam generation is supplied to the waste heat boilers 18 to 21, 28, and 31 by the motor pump 82. If the supply pressure of the water W becomes smaller than or equal to a set value, the water W is also supplied by the turbine pump 80. For this reason, only when the supply pressure of the water W becomes smaller than or equal to the set value, the steam St of an amount required to cause the turbine pump 80 to perform a given operation is supplied to the middle-pressure turbine 29 by adjusting the adjustment valve 86. If the water W is supplied only by the motor pump 82, the steam St is not supplied from the steam entrance path 83. Note that the middle-pressure turbine 29 is warmed up by the steam St from the steam exit path 84.

The turbine pump 80, and a water supply path 85a and a water supply path 85b respectively on the entrance side and the exit side of the turbine pump 80 are provided with tracing pipes 87, which pass the steam St therethrough. By repeating the supply of the steam St to these tracing pipes 87 and interruption of the supplied steam St as appropriate, or by changing the amount of steam to be passed through or the temperature of the steam St, the temperature of the water W passing therethrough is kept at an appropriate temperature. Drain water, which is the supplied steam St that has changed into condensation or condensate water and retained in the tracing pipes 87, is discharged by the steam traps T (T12 to 14) that are mounted in the tracing pipes 87.

In addition to the tracing pipes 87, the steam traps T (T8 to 11) are also arranged on the middle-pressure steam pipe 12, and the steam entrance path 83 and the steam exit path

84 of the middle-pressure turbine 29. With each steam trap T as a monitoring target, the device state information (temperature, vibration etc.) regarding the steam trap T is detected by the aforementioned detector D and transmitted to the management means S.

A manometer 88 and a flowmeter 89, which serve as detectors D, are mounted on the middle-pressure steam pipe 12, and detect the pressure and the flow rate of the steam St supplied to the steam entrance path 83 of the middle-pressure turbine 29 from the middle-pressure steam pipe 12. A manometer 90, which serves as a detector D, is also mounted on the water supply path 85, and detects the discharge pressure of the water W for steam generation supplied to the waste heat boilers 18 to 21, 28, and 31. A tachometer 91, which serves as a detector D, is mounted on the middle-pressure turbine 29, and detects the number of revolutions of the middle-pressure turbine 29. An ammeter 92 and a temperature/vibration sensor 93, which serve as detectors D, are mounted on the motor 81, and detect the current value, temperature, and vibration of the motor 81. Various kinds of detected information is transmitted to the management system S.

Figure 7:
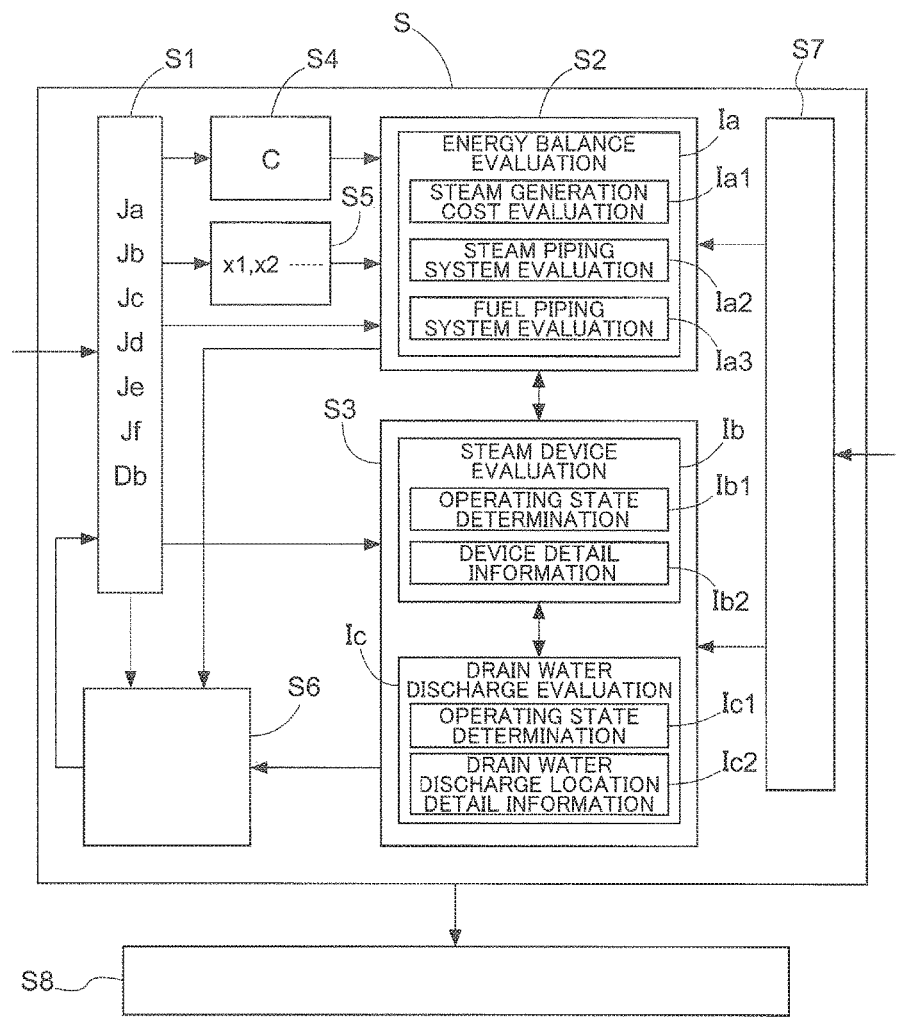
FIG. 7 is a configuration diagram of a management mean in a steam utilization facility management system.

Next, the management means S applied to the steam utilization facility P will be described. FIG. 7 shows a system configuration of the management means S. The management means S is constituted by the data input unit S1, the simulation unit S2, the monitoring unit S3, a scaling calculation unit S4, a threshold setting unit S5, a storage unit S6 that stores various kinds of information, and an instruction input unit S7 to which instructions for the simulation unit S2 and the monitoring unit S3 are input.

The data input unit S1 acquires information transmitted from the detectors D provided in the steam utilization facility P (or information collected by an inspector). Note that various kinds of acquired information are classified into information Ja to Jd as shown below.

Specifically, various kinds of acquired information are classified into steam piping system information Ja, such as the amount of steam that passes through each part of the steam piping system in the steam utilization facility P, fuel piping system information Jb that is based on the amount of fuel gas that passes through each part of the fuel gas piping system in the steam utilization facility P, or the like, device information Jc, which includes information regarding each of the devices (including not only the steam utilization devices Us but also the steam generation device Gs) in the steam utilization facility P and information regarding devices peripheral to these devices, pipes, and the like in association with each other, and drain water discharge location information Jd, which is collective state information at drain water discharge locations in the steam utilization facility P.

The steam piping system information Ja specifically is the main information regarding steam (information including flow rate, pressure, and temperature etc.), such as the steam generated by the steam generation devices Gs shown in FIG. 2, the steam supplied to the steam pipes 10 to 13 by the steam generation devices Gs and the like, the steam used by the steam utilization devices Us, the steam supplied to the steam pipes 10 to 13 from the turbine generators or the turbines 15, 22 to 24, and 29, the steam released from the vent pipe 34, the steam supplied from the first and second pressure reduction supply pipes 16 and 27 to the middle/high-pressure and middle-pressure steam pipes 11 and 12, and unknown steam that is a combination of the amount of steam that passes through and is lost at the steam traps T (e.g. FIGS. 5 and 6) connected to the steam pipes 10 to 13 and condensation in the pipes, as well as information regarding the amount of electric power generated by the turbine generators 15 and 22, information regarding electric power demand and the amount of received electric power in the steam utilization facility P, and the like.

The fuel piping system information Jb specifically is the main information regarding fuel gas (information including flow rate, pressure, temperature etc.), such as the fuel gas generated by the fuel generation devices Gf, the fuel gas supplied from the fuel generation devices Gf to the high-pressure gas pipe 40, the fuel gas used by the fuel utilization devices Uf, and the fuel gas supplied from the supply path 48 to the low-pressure gas pipe 41, as well as information regarding the fuel of C4 fraction, such as the information regarding the amount of fuel of C4 fraction generated by the combustion furnaces 44 and 45, the amount of fuel of C4 fraction used by the gas turbine 47, and the amount of fuel of C4 fraction stored in the fuel tank 46, information regarding the amount of fuel A supplied to the first boiler 14, information regarding the cost of fuel required for steam generation in the first and second boilers 14 and 17, and the like.

The device information Jc is, taking the first middle/high-pressure turbine 23 that is the steam utilization device Us as an example, collective information that includes various information from the detectors D mounted on the target first middle/high-pressure turbine 23 as well as peripheral devices such as the steam traps T and the compressor 50 in the periphery thereof, in an associated state.

The drain water discharge location information Jd is information that associates the device state information (temperature, vibration etc.) regarding the steam traps T and the valves B that are monitoring targets in the steam utilization facility P with a positional relationship between the steam traps T and the valves B and a correspondence relationship between the steam traps T and the valves B.

Stored in the storage unit S6 is reference information Je, which is collective basic information including reference values for respective values of the information Ja to Jd, specifications of the devices (the steam generation devices Gs, the steam utilization devices Us, the fuel generation devices Gf, the fuel utilization devices Uf, peripheral devices thereof, various pipes etc.) in the steam utilization facility, and types and prices of the fuel used in the respective steam generation devices Gs, improvement idea information Jf that is collective information including improvement ideas and specific execution items thereof for the steam utilization facility, and drain water discharge database Db constituted by information regarding drain water discharge locations, such as the piping layout of the pipes on which the steam traps T and the valves B are arranged created in advance through inspection or the like, and the models, operating state, and positions of the steam traps T and the valves B. As the reference values, values of information at the time of designing the steam utilization facility P, values detected during inspection of the steam utilization facility P, and the like are stored.

The data input unit S1 acquires the information Ja to Jd that is transmitted from the detectors D or collected by an inspector, as well as the reference information Je, the improvement idea information Jf, and the drain water discharge database Db from the storage unit S6. That is to say, the data input unit S1 acquires various kinds of information Ja to Jf and Db. Based on the acquired information, the energy balance evaluation information Ia is generated by the simulation unit S2, and the steam device evaluation information Ib and the drain water discharge evaluation information Ic, which serve as monitoring results, are generated by the monitoring unit S3. Various kinds of information Ia to Ic selected by the instruction input unit S7 is displayed on an output means S8.

Next, generation of the energy balance evaluation information Ia by the simulation unit S2 will be described. The energy balance evaluation information Ia includes steam generation cost evaluation information Ia1, steam piping system evaluation information Ia2, and fuel piping system evaluation information Ia3.

Here is a description of the steam generation cost evaluation information Ia1. In general, the necessary costs for generating steam with a steam generation device in a steam utilization facility are formed by a plurality of steam generation cost factors, such as the amount of steam generated by each steam generation device, the type and price of fuel used by each steam generation device and the amount of used fuel (regarding each type of fuel in the case of using two or more types of fuel), and steam generation efficiency with respect to the amount of fuel used by each steam generation device. These steam generation cost factors reflect the running state of the steam utilization facility.

Therefore, the management means S calculates a steam generation cost C while setting a plurality of steam generation cost factors that reflect the running state of the steam utilization facility to a single reference value that can be readily ascertained, and evaluates the steam system in terms of costs and generates the steam generation cost evaluation information Ia1 for evaluating the running state of the steam utilization facility particularly regarding the necessity for improvement to the steam utilization facility (necessity for improvement), based on the steam generation cost C. The evaluation of the necessity for improvement to the steam utilization facility will make it clear that some kind of problem or points to be improved exist in the steam utilization facility, and help optimization of the running state of the steam utilization facility.

For generating the steam generation cost evaluation information Ia1, initially, the scaling calculation unit S4 calculates the steam generation cost C, which is a value obtained by scaling (or normalizing) a plurality of steam generation cost factors into a single reference value. For example, the steam generation cost factors are the amount of steam generated by each steam generation device Gs, the amount of fuel used by each steam generation device Gs, and the type and price of the fuel.

More specifically, the total amount of steam generated by the steam generation devices Gs is obtained by adding up the amounts of steam generated by the respective boilers 14, 17 to 21, 28, and 31. Next, the total fuel cost for the steam generation devices Gs is obtained based on the amount of respective types of fuel used by the first and second boilers 14 and 17 (the respective amounts of used fuel gas and fuel A for the first boiler 14, and the amount of used fuel gas for the second boiler) and the price of the respective types of fuel (the waste heat boilers 18 to 21, 28, and 31 are excluded because steam is generated by waste heat generated during the running of the steam utilization facility P). The steam generation cost C is calculated by dividing the total amount of steam generated by the steam generation devices Gs by the total fuel cost for the steam generation devices Gs.

A threshold setting unit S5 sets a threshold for evaluating the necessity for improvement to the steam utilization facility based on a reference value of the steam generation cost C for the steam utilization facility P in the reference information Je. Specifically, a first threshold x1, which is higher than the reference value and serves as a reference indicating that the steam utilization facility needs to be improved, and a second threshold x2, which is lower than the reference value and serves as a reference indicating that the steam utilization facility is being adequately run, are set. Note that, a threshold for evaluating the necessity for improvement to the steam utilization facility may also be set in place of or in addition to the first and second thresholds x1 and x2.

The simulation unit S2 evaluates the necessity for improvement to the steam utilization facility to generate the steam generation cost evaluation information Ia1. Specifically, it is evaluated that the steam utilization facility P needs to be improved if the calculated steam generation cost C exceeds the first threshold x1. Thus, it can be found that the steam utilization facility needs to be improved, which helps with finding the points to be improved to optimize the running state of the steam utilization facility. It is evaluated that the steam utilization facility P is being adequately operated if the steam generation cost C is smaller than the second threshold x2. Thus, it can be found that the steam utilization facility is being adequately operated, and for example, the state of the steam utilization facility for which it has been determined that the steam utilization facility is being adequately operated can be used as a reference for optimization of the running state of the steam utilization facility.

If the value of the calculated steam generation cost C is between the first threshold and the second threshold, the simulation unit S2 evaluates that the steam utilization facility P is being normally run. Note that the necessity for improvement for the steam utilization facility P may be evaluated in stages (high/middle/low urgency for improvement, high/middle/low degree of adequateness of the running etc.) by, for example, the threshold setting unit S3 also setting a threshold in addition to the first and second thresholds x1 and x2.

The simulation unit S2 may also generate an improvement measure for the steam utilization facility P in the evaluation of the necessity for improvement. The improvement measure is generated by referencing the acquired improvement idea information Jf and deriving, through calculation, one improvement idea or a combination of improvement ideas that are optimal for improvement to the current steam utilization facility P. Alternatively, the improvement measure may also be generated by other appropriate means, for example, by storing corrective maintenance information in the storage unit S6 in advance and determining a location of an abnormality based on a comparison between the values of various information Ja to Jd acquired by the data input unit S1 and corresponding reference values in the reference information Je (e.g. recognizing a location in the steam utilization facility P at which the difference from the reference value is a value that exceeds an allowable range as the location of an abnormality, or recognizing the location of an abnormality after making a determination by combining information comparison results, etc.) and acquiring corrective maintenance information corresponding to this location of an abnormality.

Figure 8:
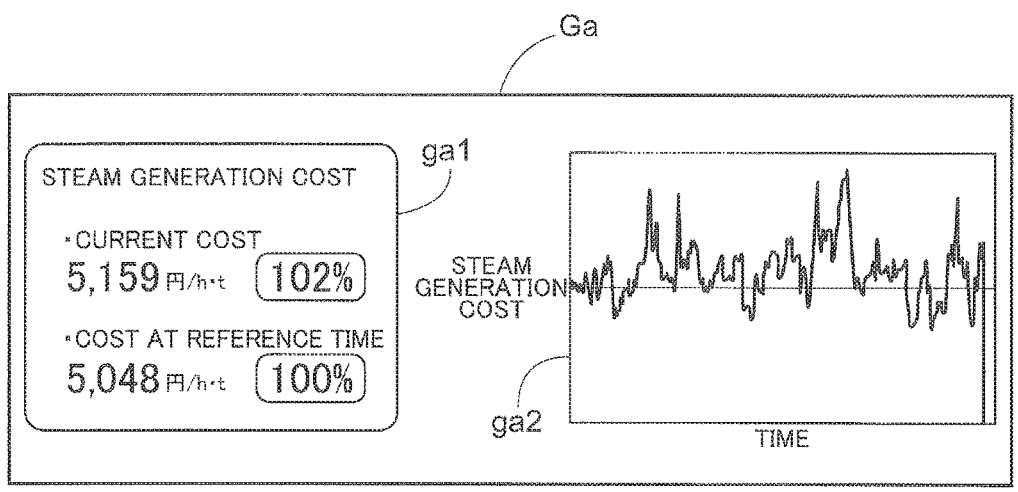
FIG. 8 is an illustrative diagram of an output image of graph information regarding steam generation costs.

The simulation unit S2 also displays, on the output means S8, a graph information image Ga shown in FIG. 8 as one item of the steam generation cost evaluation information Ia1. The graph information image Ga includes a value display space ga1 that displays the value of the calculated steam generation cost C and the reference value thereof, and the percentage of the value of the steam generation cost C in the case where the reference value thereof is 100%, and a graph display space ga2 that displays a graph indicating a chronological change in the steam generation cost C. The graph display space ga2 displays a line indicating a reference value of the steam generation cost together with a line indicating the chronological changes in the steam generation cost.

The past changes in the steam generation cost C as well as the current steam generation cost C can be ascertained from the chronological changes in the steam generation cost. Therefore, for example, factors of the past changes in the steam generation cost C can be analyzed by, for example, referencing the past running situation of the steam utilization facility P, and thus, the necessity for improvement to the steam utilization facility can be accurately evaluated.

Note that the graph display space ga2 may also display together a line indicating a chronological change in the fuel consumed in the steam utilization facility P. In the case of generating steam also using the waste heat boilers 18 to 21, 28, and 31 as in the case of the steam utilization facility P, the amount of waste heat generated by the running further reduces as a smaller amount of fuel is consumed in the steam utilization facility P, i.e. as the running of the steam utilization facility P is delayed more, and the amount of steam generated by the waste heat boilers 18 to 21, 28, and 31 reduces. Then, steam has to be generated using the fuel by the first and second boilers for an amount that corresponds to the amount of reduction, which leads to an increase in the amount of fuel used by the steam generation devices Gs, resulting in an increase in the steam generation cost C. Thus, the steam generation cost C and the fuel consumed in the steam utilization facility P have some degree of correlation. Therefore, the necessity for improvement to the steam utilization facility can be more accurately evaluated by displaying the chronological change in the steam generation cost and the chronological change in the fuel consumed in the steam utilization facility P together.

The evaluation of the necessity for improvement and the improvement measure generated by the simulation unit S2 are displayed on the graph information image Ga. Note that the content of the evaluation of the necessity for improvement and the improvement measure may be transmitted to a communication terminal of the administrator such as a computer or a mobile phone by a communication unit that is not shown, for example. The evaluation of the necessity for improvement and the improvement measure may be displayed on the graph information image Ga and transmitted to the communication terminal in accordance with the content of the evaluation of the necessity for improvement. For example, such display and transmission may be performed only when it has been evaluated that the steam utilization facility P needs to be improved or when the steam utilization facility P is being adequately run.

Figure 9:
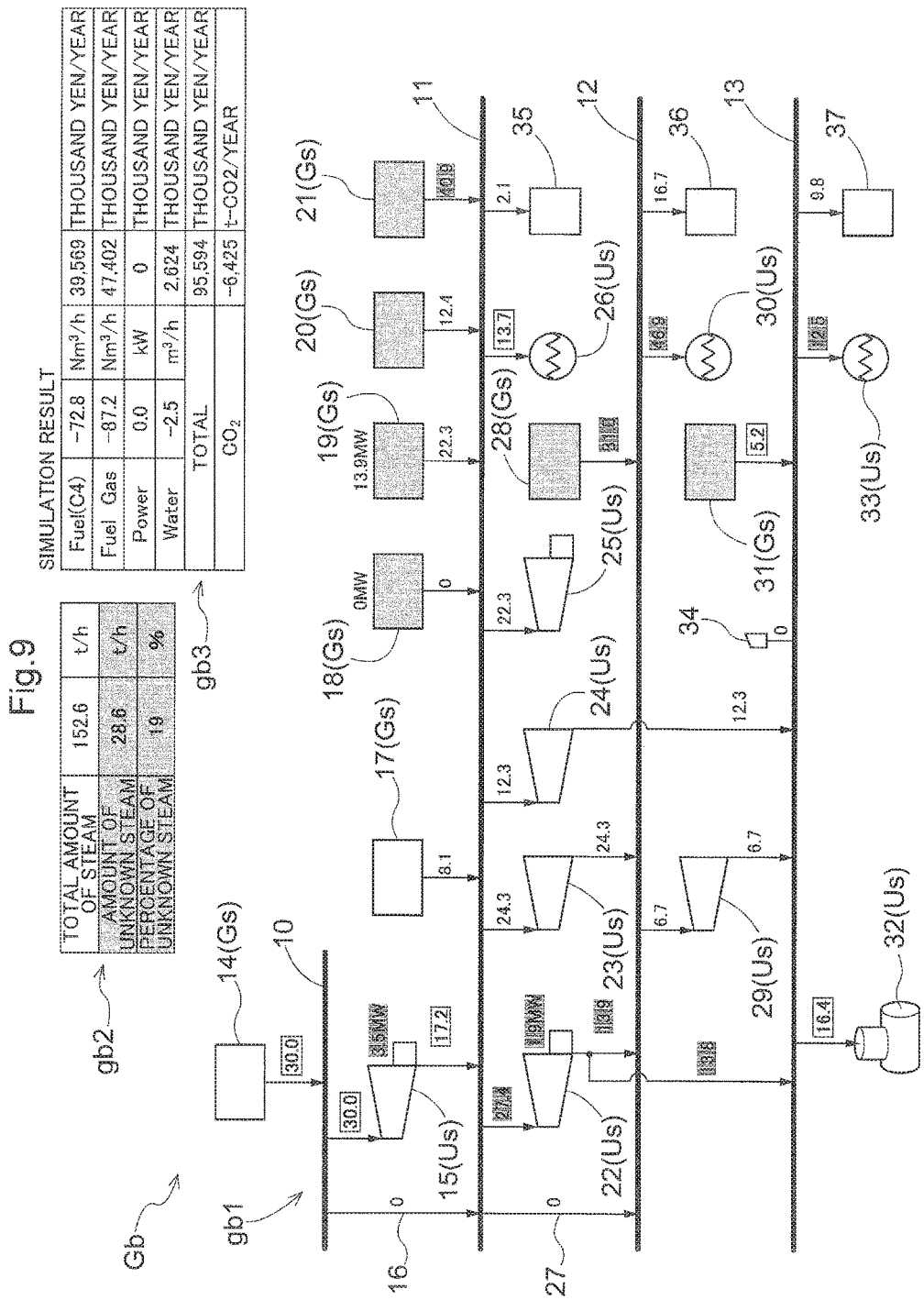
FIG. 9 is an illustrative diagram of an output image of the steam piping system in the steam utilization facility.

Here is a description of the steam piping system evaluation information Ia2. The simulation unit S2 displays, as the steam piping system evaluation information Ia2, a steam piping system image Gb, which is a configuration diagram of the steam piping system in the steam utilization facility P in which each part of the steam piping system is shown as a display body as shown in FIG. 9, on the output means S8 based on the steam piping system information Ja.

To generate the steam piping system evaluation information Ia2, the simulation unit S2 calculates information regarding a comparison between the amount of steam that passes through each part of the steam piping system in the steam utilization facility P in the steam piping system Ja and the reference value corresponding to this amount of steam in the reference information Je (the relationship regarding which is larger or smaller and the difference therebetween etc.). In the steam piping system image Gb, the value of the amount of steam that passes through a part corresponding to each display body among the acquired values of the amount of steam is displayed near this display body in a state where the value of the amount of steam is associated with the comparison information. "A state where the value of the amount of steam is associated with the comparison information" refers to, for example, a state where the value of the amount of steam is displayed with different colors, the value is emphasized, the value is enclosed by a frame or shaded, or arrows or lines that connect the devices and the pipes are displayed with different colors or emphasized, in accordance with the relationship regarding which is larger or smaller and the difference between the value of the amount of steam and the reference value.

The steam piping system image Gb includes a facility configuration display space gb1 that shows the steam piping system in the steam utilization facility P, a steam amount display space gb2 that shows the total amount of generated steam, the amount of unknown steam, and the percentage of unknown steam (the percentage of the amount of unknown steam in the total amount of generated steam) in the steam utilization facility P, and a fuel etc. display space gb3 that shows the amount of each type of consumed fuel, the amount of generated electric power, the amount of consumed water, the amount of consumed $CO_2$, and the like in the steam utilization facility P.

In the facility configuration display space gb1, assuming a total value of the amount of lost steam that passes through a large number of steam traps T connected to the steam pipes 10 to 13 and the amount of lost steam that is lost due to condensation during the feeding through the steam pipes 10 to 13 as the amount of unknown steam in the steam pipes 10 to 13, display bodies 35 to 37 that are assumed to be destinations of the amount of this unknown steam are displayed in addition to the display bodies 10 to 34 indicating respective constituents described in FIG. 2. Near the display bodies 10 to 37 in the facility configuration display space gb1, information regarding the amount of steam (t/h) that passes through the respective display bodies 10 to 37 are displayed in a state where the information is associated with the comparison information (in FIG. 9, a display body having a higher value than the reference value is shaded, and a display body having a lower value than the reference value is enclosed by a frame).

The steam amount display space gb2 displays the total amount of generated steam, the amount of unknown steam, and the percentage of unknown steam in the steam utilization facility P, in a state where they are associated with the comparison information (in FIG. 9, a higher value than the reference value is shaded).

The fuel etc. display space gb3 displays the amount of each type of consumed fuel (in this example, fuel (C4) and fuel gas), the amount of generated electric power, the amount of consumed water, differences from the reference values thereof in the reference information Je and values of these differences converted into the monetary amount, and a difference between the amount of consumed $CO_2$ and the reference value thereof.

From the steam piping system image Gb, the amount of steam, the amount of each type of consumed fuel, the amount of generated electric power, the amount of consumed water, the amount of consumed $CO_2$, and the values thereof converted into the monetary amount at the time of reference running and in the current running can be ascertained, and the running status of the steam piping system in the steam utilization facility P is made clear.

Furthermore, particularly from the facility configuration display space gb1 and the steam amount display space gb2, the steam balance in the overall steam utilization facility is made clear as energy balance. For example, the running status of the steam utilization facility can be ascertained from the viewpoints of steam-saving, such as in terms of the amount of steam loss existing in the steam system in the steam utilization facility, and a method for reducing the loss and the amount of reducible loss with this method.

Also, the balance between heat and electric power is made clear from the total amount of generated steam in the steam utilization facility P in the steam amount display space gb2 and the amount of generated electric power in the fuel etc. display space gb3. For example, a change in the cost required for steam generation due to a change in the unit price of the fuel, and the optimal balance between heat and electric power in the steam utilization facility obtained while giving consideration to the amount of electric power and a change in the cost in power purchase can be ascertained.

Figure 10:
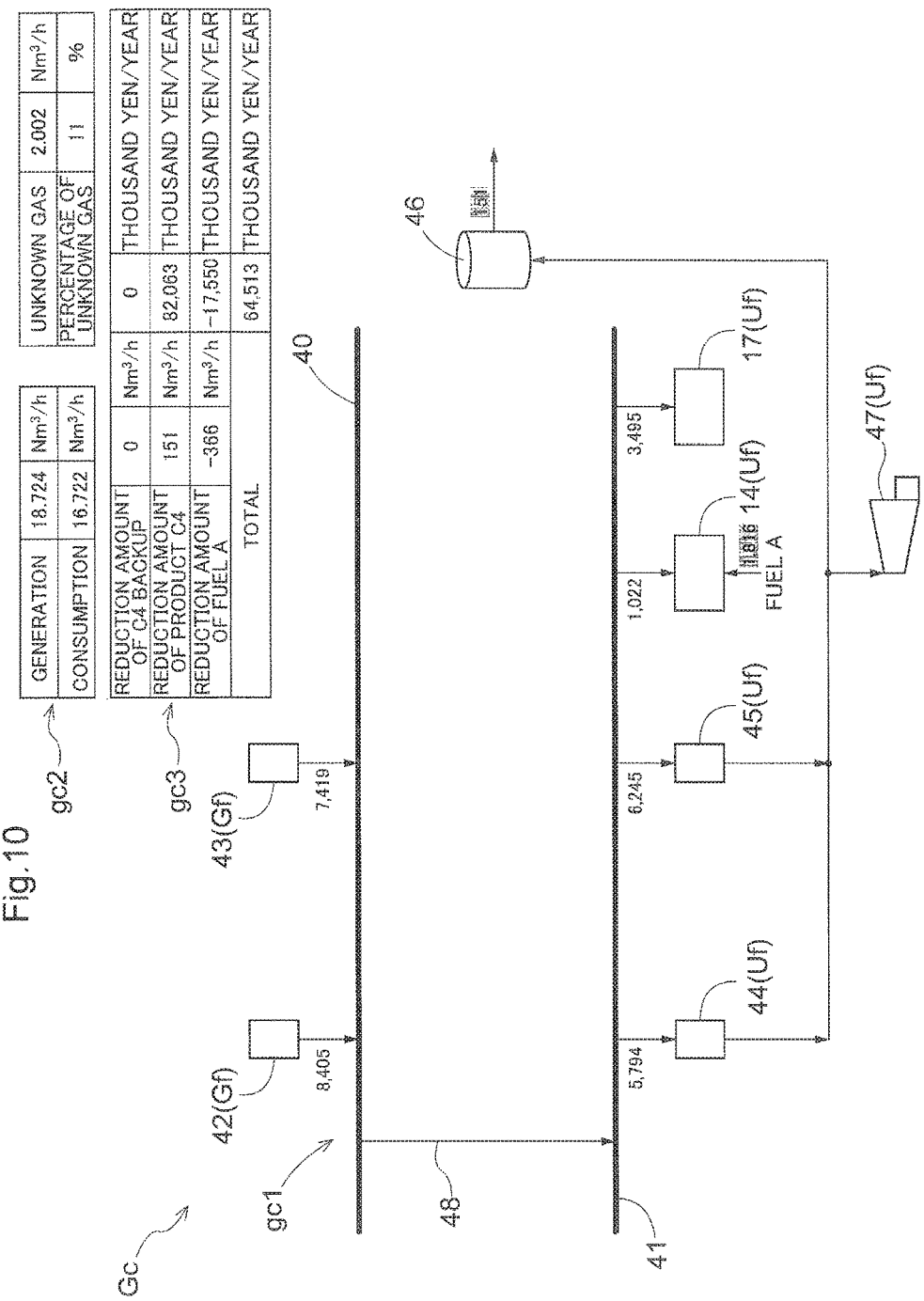
FIG. 10 is an illustrative diagram of an output image of the fuel piping system in the steam utilization facility.

Here is a description of the fuel piping system evaluation information Ia3. The simulation unit S2 displays, on the output means S8, a fuel piping system image Gc shown in FIG. 10 that serves as fuel piping system evaluation information Ia3, which is a configuration diagram of the fuel piping system in the steam utilization facility P in which each part of the fuel piping system is shown as a display body, based on the fuel piping system information Jb.

When generating the fuel piping system evaluation information Ia3, the simulation unit S2 calculates information regarding a comparison between information regarding the amount of each type of fuel that passes through each part of the fuel piping system in the steam utilization facility P in the fuel piping system information Jb and the like, and the reference value corresponding to this information in the reference information Je (a relationship regarding which is larger or smaller, a difference therebetween etc.). In the fuel piping system image Gc, the value of the amount of fuel that passes through a region corresponding to each display body among acquired values of the amount of fuel is displayed near the corresponding display body, in a state where the value of the amount of fuel is associated with comparison information regarding this value. "A state where the value of the amount of fuel is associated with comparison information regarding this value" refers to, for example, a state where the value of each type of fuel is displayed with different colors, the value is emphasized, the value is enclosed by a frame or shaded, or arrows or lines connecting the devices and the pipes are displayed with different colors or emphasized, in accordance with the relationship regarding which is larger or smaller and the difference between the value of each type of fuel and the reference value.

The fuel piping system image Gc includes a facility configuration display space gc1 that shows the fuel piping system in the steam utilization facility P, a fuel gas consumption display space gb2 that shows the total amount of generated fuel gas, the total amount of consumed fuel gas, the amount of unknown gas, and the percentage of unknown gas (the percentage of the amount of unknown steam in the total amount of generated fuel gas) in the steam utilization facility P, and the fuel etc. display space gb3 that shows the amount of each type of consumed fuel in the steam utilization facility P.

The facility configuration display space gc1 displays display bodies 40 to 48 that indicates respective constituents described in FIG. 2. The information regarding the amount (t/h) of each type of fuel (in this example, the fuel gas and the fuel of C4 fraction) that is fed from the display bodies 40 to 48 or supplied to the display bodies 40 to 48 is displayed in a state where the amount is associated with comparison information (in FIG. 10, a higher value than the reference value is shaded, and a lower value than the reference value is enclosed by a frame) near the respective display bodies 40 to 48 in the facility configuration display space g1.

In the fuel gas amount display space gc2, the total amount of generated fuel gas, the total amount of consumed fuel gas, the amount of unknown gas, and the percentage of unknown gas in the steam utilization facility P are displayed in a state where they are associated with comparison information (in this example, a higher value than the reference value is shaded, and a lower value than the reference value is enclosed by a frame).

The fuel etc. display space gc3 displays a difference between the amount of each type of consumed fuel (in this example, the amounts of consumed fuel gas, fuel in C4 fraction, and fuel A) and the reference value thereof in the reference information Je, and the value of the difference converted into a monetary amount.

With the fuel piping system image Gc, the amount of each type of fuel gas, the amount of each type of consumed fuel, and the values thereof converted into the monetary amount at the time of reference running and the current running can be ascertained, and the running status of the fuel piping system in the steam utilization facility P is made clear.

Furthermore, particularly with the facility configuration display space ge1, the fuel balance between the amount of fuel consumed in the first and second boilers 14 and 17 and the amount of fuel stored in the fuel tank 46 and shipped is made clear. Then, for example, the balance between the amount of shipped fuel and the sales with respect to the running status such as the steam use status of the steam utilization facility can be ascertained.

Next, the steam device evaluation information Ib generated by the monitoring unit S3 will be described. This steam device evaluation information Ib includes operating state determination information Ib1 and device detail information Ib2.

Initially, when generating the operating state determination information Ib1, the monitoring unit S3 determines the operating states of respective devices such as the steam utilization devices Us and the steam generation devices Gs based on the detection information from the detectors D.

For example, in the determination of the operating states of the first middle/high-pressure turbine 23 and the middle-pressure turbine 29 shown in FIG. 5, the monitoring unit S3 monitors the detection information from the detectors D based on the following monitoring items.

(1) The operation of the first middle/high-pressure steam turbine 23 and the compressor 50 is checked based on the detection information from the manometer 63 and the flow-meter 69 on the steam entrance path 51, the manometer 64 on the steam exit path 52, the manometer 65 on the fuel gas supply path 53, the manometer 66 and the flowmeter 70 on the liquid fuel supply path 54, and the tachometer 71 on the first middle/high-pressure steam turbine 23.

(2) The operation of the motor pump 57 is checked based on the detection information from the manometer 67 on the lubricating oil supply path 59.

(3) The operation of the turbine pump 56 is checked based on the detection information from the manometer 68 on the lubricating oil supply path when the turbine pump 56 is operating.

(4) The operation of the motor 58 is checked based on a detection signal from the temperature/vibration sensor 72 of the motor 58.

Furthermore, this monitoring unit S3 monitors the following items based on detection signals from the detectors D arranged on the steam traps T.

(5) When the first middle/high-pressure turbine 23 is in a standby state, it is checked whether any drain water is retained in the steam traps T1 to T3, and it is also checked whether the first middle/high-pressure turbine 23 is in a state of being able to immediately operate (e.g. the risk of the occurrence water hammer).

(6) While the first middle/high-pressure turbine 23 is operating, it is checked whether any drain water is retained in the steam traps T1 to T3, to check the risk of mixing of drain water with the steam supplied to the first middle/high-pressure turbine 23.

(7) While the first middle/high-pressure turbine 23 is operating, it is checked whether the temperature of the steam traps T1 to T3 appropriately changes, to check that steam has been supplied to the first middle/high-pressure turbine 23 without any problem.

(8) When the middle-pressure turbine 29 is in a standby state, it is checked whether any drain water is retained in the steam traps T4 to T7, to check whether the middle-pressure turbine 29 is in a state of being able to immediately operate (e.g. the risk of the occurrence water hammer).

(9) While the middle-pressure turbine 29 is operating, it is checked whether any drain water is retained in the steam traps T4 to T7, to check the risk of mixing of drain water with the steam supplied to the middle-pressure turbine 29.

(10) While the middle-pressure turbine 29 is operating, it is checked whether the temperature of the steam traps T4 to T7 appropriately changes, to check that steam has been supplied to the middle-pressure turbine 29 without any problem.

(11) In the case where a decrease in the flow rate of the liquid fuel L has been detected from the detection information from the flowmeter 70 on the liquid fuel supply path 54, turbine efficiency of the first middle/high-pressure turbine 23 is calculated from the pressure of steam input to and output from the first middle/high pressure turbine 23 at the manometers 63 and 64 on the steam entrance path 51 and the steam exit path 52, the steam temperature based on the temperature of the steam traps T1 and T2 from the detectors D, and the number of revolutions of the first middle/high pressure turbine 23 at the tachometer 71 on the first middle/high pressure turbine 23, and based on the turbine efficiency, it is determined whether the cause of the decrease in the flow rate of the liquid fuel L exists on the steam side or the gas side.

This monitoring unit S3 comprehensively determines the above monitoring items (1) to (11) and determines the operating states of the first middle/high-pressure turbine 23 and the middle-pressure turbine 29 that serve as steam utilization devices Us. In particular, the detection information regarding the steam traps T is also used in the determination of the operating states of the first middle/high-pressure turbine 23 and the middle-pressure turbine 29. Therefore, it is possible to check whether the steam utilization devices Us are in a state of being able to immediately operate, check the risk of mixing of drain water with supplied steam, check the flow of steam when the steam utilization devices Us are operating, and estimate the cause of the abnormality, for example, as in the above monitoring items (5) to (11) that did not exist in conventional techniques.

In determining the operating state of the middle-pressure turbine 29 shown in FIG. 6, the monitoring unit S3 monitors the detection information from the detectors D based on the following monitoring items.

(a) The operation of the middle-pressure turbine 29 is checked based on the detection information from the manometer 88 and the flowmeter 89 on the middle-pressure steam pipe 12 and the tachometer 91 on the middle-pressure turbine 29.

(b) The operation of the motor 81 and the motor pump 82 is checked based on the detection information from the manometer 90 on the water supply path 85 and the ammeter 92 and the temperature/vibration sensor 93 on the motor 81.

Furthermore, this monitoring unit S3 monitors the following items based on detection information from the detectors D arranged on the steam traps T.

(c) When the middle-pressure turbine 29 is in a standby state, it is checked whether any drain water is retained in the steam traps T8 to T11, to check whether the middle-pressure turbine 29 is in a state of being able to operate immediately (e.g. the risk of the occurrence of water hammer).

(d) When the middle-pressure turbine 29 is operating, it is checked whether any drain water is retained in the steam traps T8 to T11, to check the risk of mixing of drain water with the steam supplied to the middle-pressure turbine 29.

(e) When the middle-pressure turbine 29 is operating, it is checked whether the temperature of the steam trap T10 appropriately changes, to check that steam has been supplied to the middle-pressure turbine 29 without any problem.

(f) It is checked whether any drain water is retained in the steam traps T12 to T14, the operation of the tracing pipes 87 is checked, and the possibility that the water supply path 85 is frozen during winter, for example, is checked.

This monitoring unit S3 comprehensively determines the above monitoring items (a) to (f), and determines the operating state of the middle-pressure turbine 29 that serves as a steam utilization device Us. In particular, this monitoring unit S3 also uses the detection information regarding the steam traps T in the determination of the operating state of the middle-pressure turbine 29. Therefore, it is possible to check whether the steam utilization device is in a state of being able to immediately operate, check the risk of mixing of drain water with supplied steam, check the flow of steam when the steam utilization device is operating, and check the possibility that the water supply path 85 is frozen, for example, as in the above monitoring items (c) to (f) that did not exist in conventional techniques.

Figure 11:
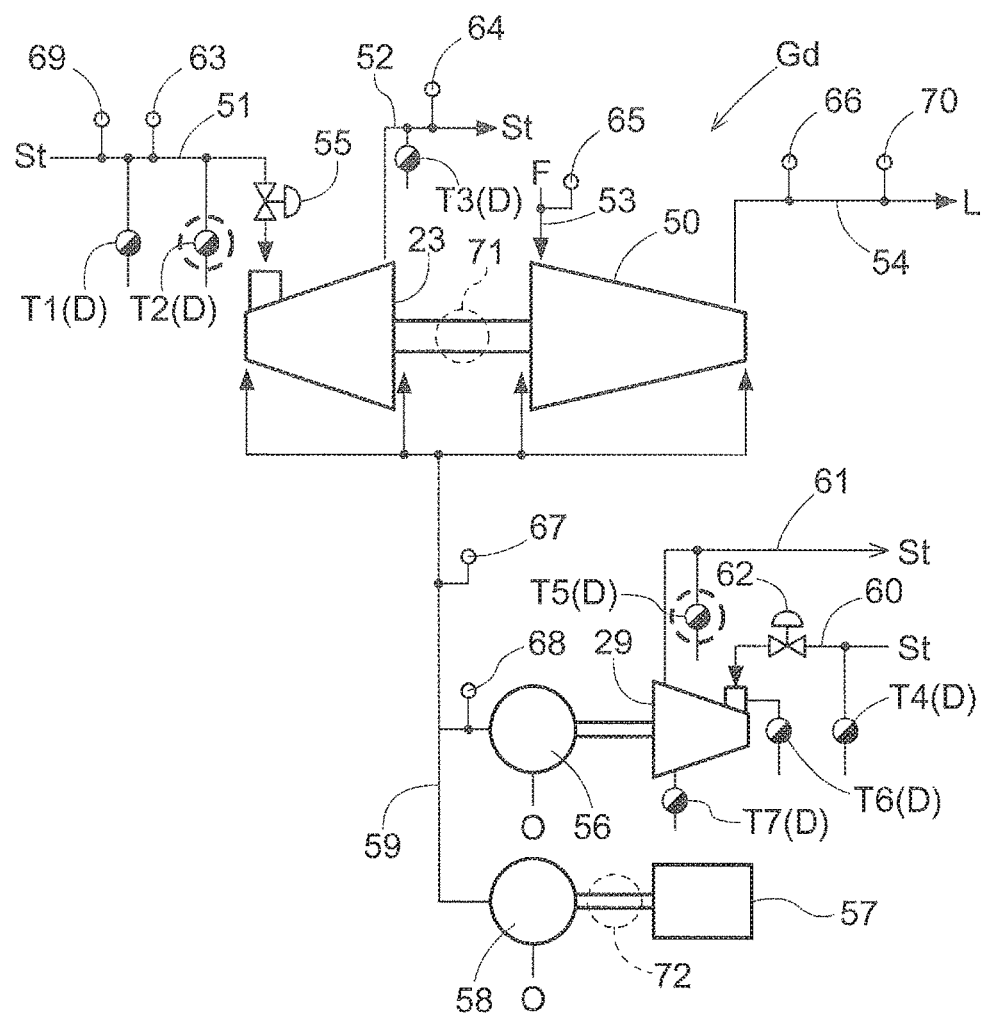
FIG. 11 is an illustrative diagram of an output image of the periphery of the first middle/high-pressure turbine in the steam utilization facility.
Figure 12:
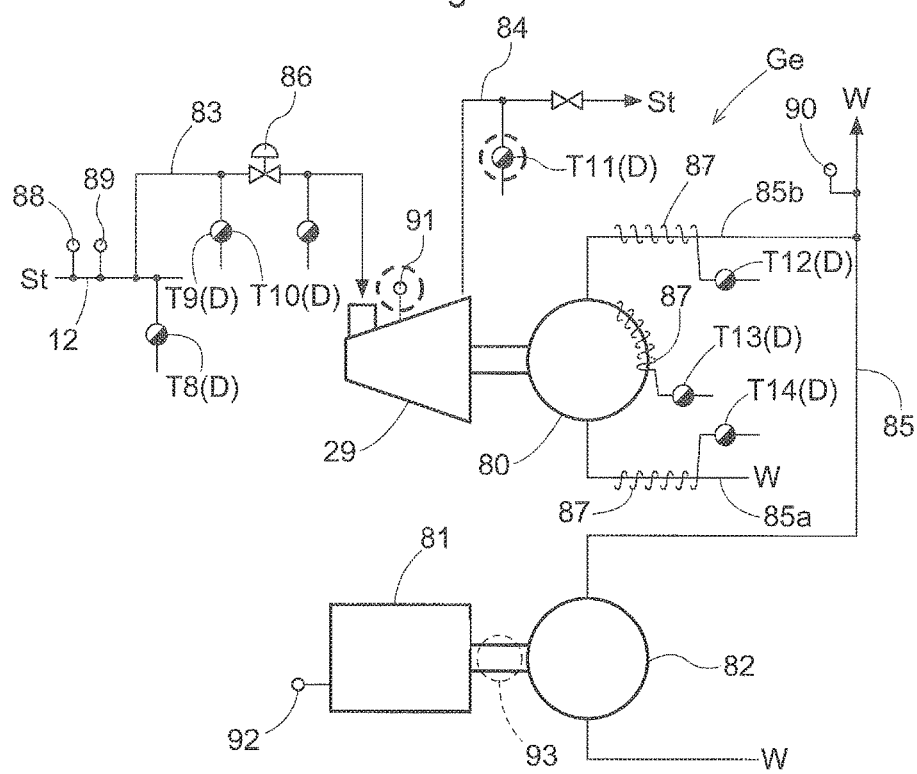
FIG. 12 is an illustrative diagram of an output image of the periphery of the middle-pressure turbine in the steam utilization facility.

Then, the monitoring unit S3 displays, for respective target devices (the steam generation devices Gs and the steam utilization devices Us etc.), the operating state information Ib1, i.e. device images, which are configuration diagrams of devices and the periphery thereof in which the target devices as well as peripheral devices and pipes thereof are shown as display bodies, e.g. device images Gd and Ge shown in FIGS. 11 and 12, on the output means S8 based on the device information Jc and the result of the above determination of the operating states of the respective devices (whether the devices are operating normally etc.). Then, in the device images Gd and Ge, the display bodies are displayed in a state where each display body is associated with the result of the determination of the operating state. "A state where each display body is associated with the result of the determination of the operating state" refers to, for example, a state where each display body is displayed with different colors, enclosed by a frame, or emphasized in accordance with the determination result.

For example, in the device image Gd shown in FIG. 11, display bodies 23, 29, 50 to 72, and T that indicate respective constituent elements described in FIG. 5 are displayed in a state where they are associated with the result of the determination of the operating states of the respective devices (e.g. if a certain location (in FIG. 11, the steam traps T2 and T5) is determined as being abnormal, this location is circled).

Also, for example, in the device image Ge shown in FIG. 12, display bodies 29, 80 to 93, and T that indicate respective constituents described in FIG. 6 are displayed in a state where they are associated with the comparison information (similar to FIG. 11, if a certain location (in FIG. 12, the steam trap T11 and the tachometer 91 on the middle-pressure turbine 29) is determined as being abnormal, this location is circled).

Furthermore, by selecting a display body on the device images through selection processing performed on the instruction input unit S7 in the respective device images, the device detail information Ib2 corresponding to the selected display body is displayed on the output means S8. As the device detail information Ib2, the model of a device, the details of the operating state thereof, history information such as past failure information and inspection results, and work instruction information that corresponds to an abnormality in the case where the operating state of the device is abnormal, are displayed. As the work instruction information, for example, an image of the corresponding device, information regarding the arrangement place thereof, and an appropriate work instruction in accordance with the model of the corresponding device, and the content of the determination information relating thereto (the type of the abnormality, the degree of the abnormality etc.) are displayed.

By referring to the history information, it is possible to ascertain the frequency of failures in the device and the cause of failures, and to determine the necessity for review of the models of the installed devices and change of peripheral devices, for example, which leads to optimization of the running state of the steam utilization facility. In addition, the work instruction information enables prompt handling of the abnormality.

Next, generation of the drain water discharge evaluation information Ic by the monitoring unit S3 will be described. This steam device evaluation information Ic includes the operating state determination information Ic1 and drain water the discharge location detail information Ic2.

Figure 13:
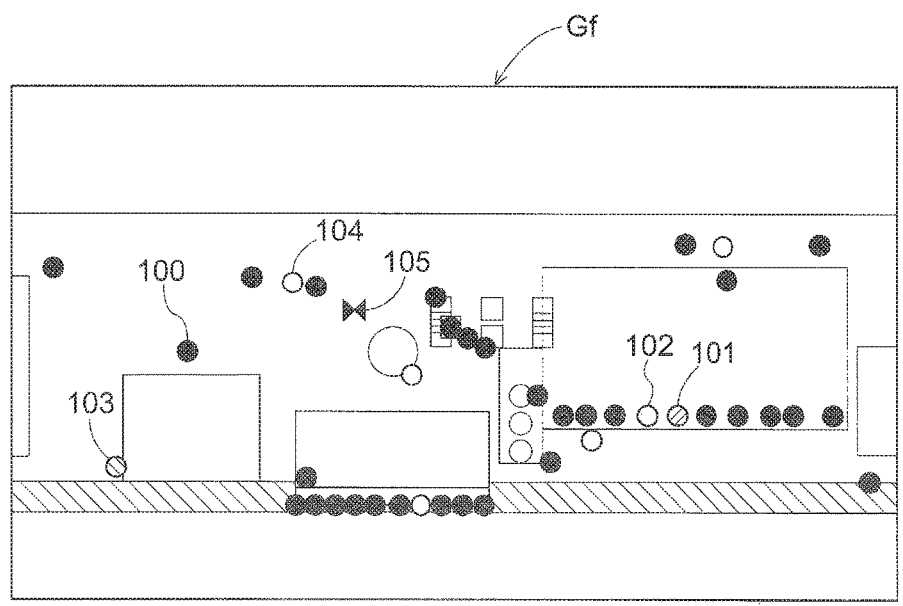
FIG. 13 is an illustrative diagram of an output image at drain water discharge locations.

The monitoring unit S3 displays, on the output means S8, the operating state determination information Ic1, which is an image combining an arrangement diagram that displays display bodies indicating the drain water discharge locations (the steam traps T and the valves B) in the steam utilization facility P with the operating states at the respective drain water discharge locations, e.g. a drain water discharge evaluation image Gf shown in FIG. 13, based on the drain water discharge location information Jd and the drain water discharge database Db.

Specifically, the monitoring unit S3 determines the operating state at each drain water discharge location based on a comparison between the drain water discharge location information Jd (device state information (temperature, vibration etc.) at each drain water discharge location) and the reference value corresponding thereto in the reference information Je, and determines whether the operating state is normal or abnormal, the type of the abnormality (steam leakage abnormality, blocked trap abnormality, temperature abnormality etc.), and the degree of the abnormality (e.g. warning level and failure level etc.).

Note that the steam leakage abnormality (leakage failure) refers to an abnormality in which, although the steam traps T are required to perform their original function of discharging only condensation while inhibiting an outflow of steam, the steam flows out beyond the allowable limit. The blocked trap abnormality (clogging failure) refers to an abnormality in which condensation is not smoothly discharged (i.e. clogged trap), and the temperature abnormality refers to an abnormality in which the trap temperature or the trap peripheral temperature deviates from a proper range to the lower side or the upper side.

The monitoring unit S3 updates the drain water discharge database Db to the latest state based on the result of the determination of the operating state at each drain water discharge location. An arrangement diagram (e.g. the drain water discharge evaluation image Gf) in which each drain water discharge location is displayed as a display body based on the updated drain water discharge database Db is generated, and the display body of each drain water discharge location is displayed on the arrangement diagram in a state where each display body is associated with the above determination result. "A state where each display body is associated with the determination result" refers to, for example, a state where each display body is displayed with different colors or emphasized, or the display thereof is changed in accordance with the content of the determination result.

For example, the drain water discharge location image Gf indicates the arrangement of the drain water discharge locations in a part of the steam utilization facility P, and the respective drain water discharge locations are displayed as display bodies T and B in the arrangement place thereof. The display bodies T and B are displayed in a state where they are associated with the above determination information. In this example, in the case of the display body T for example, in FIG. 13, 100 denotes that the state of the steam trap T is normal, 101 denotes that the state of the steam trap T is at a warning level of the steam leakage abnormality, 102 denotes that the state of the steam trap T is at a failure level of the steam leakage abnormality, 103 denotes that the state of the steam trap T is a temperature abnormality, 104 denotes that the steam trap T is not being used, and 105 denotes that the state of the valve is normal. Thus, the image Gf allows the state of the drain water discharge locations to be visually ascertained.

Furthermore, by selecting a display body T, B through selection processing performed on the instruction input unit S7 in the arrangement diagram of the drain water discharge locations serving as the operating state determination information Ic1, the drain water discharge location detail information Ic2 regarding the drain water discharge location installed in the arrangement place corresponding to the selected display body T is displayed on the output means S8. As the drain water discharge location detail information Ic2, the details of the state of the drain water discharge location, history information such as past failure information and inspection results, and work instruction information corresponding to an abnormality in the case where the operating state at the drain water discharge location is abnormal, are displayed. The history information is not limited to the information regarding the steam traps T and the valves B that are currently installed in this arrangement place, and information regarding the steam traps T and valves B that have been arranged in the past at this arrangement place and replaced is also displayed. As the work instruction information, an image of the corresponding steam trap T or valve B, information regarding the arrangement place thereof, and a work instruction that is suitable for the location and type of the corresponding steam trap T or valve B, and the content of the determination information relating thereto (the type of the abnormality, the degree of the abnormality etc.) are displayed.

By referencing the history information, it is possible to ascertain the frequency of failure in the steam traps and the valves, and the cause of the failure, and to determine the necessity for reviewing the models of the steam traps T and the valves B, and for changing related steam traps T or valves B or the piping layout, which leads to optimization of the running state of the steam utilization facility. In addition, the work instruction information enables prompt handling of the abnormality.

Note that the drain water discharge location image Gf may be an image in which the drain water discharge locations (the steam traps T and the valves B) are displayed as display bodies on a map indicating a process flow in the steam utilization facility P.

As described above, the management means S achieves visualization of the steam system from three viewpoints that are the energy balance evaluation information Ia, the steam device evaluation information Ib, and the drain water discharge evaluation information Ic, by the simulation unit S2 and the monitoring unit S3, and utilizes this visualization for optimization of the running state of the steam utilization facility by the administrator in charge of the steam utilization facility P.

The above evaluation information Ia to Ic, the calculated steam generation cost C, the updated drain water discharge database Db, and the information Ja to Jd acquired by the data input unit are stored in the storage unit S6. Thus, the steam system can be ascertained by looking back at the past running state of the steam utilization facility retrospectively.

The output means S8 also generates an improvement idea image Gg shown in FIG. 14 in which improvement ideas are listed, based on the improvement idea information Jf. By inputting one or a plurality of the listed improvement ideas using the instruction input unit S7 (or based on an improvement measure generated by the simulation unit S2), the simulation unit S2 calculates an improved steam generation cost, improved steam piping system information, and improved fuel piping system information, which are pieces of information after implementing the selected improvement idea (or the aforementioned improvement measure). Note that the improved steam generation cost is the value of the steam generation cost C after implementing the improvement, the improved steam piping system information is the steam piping system information Ja after implementing the improvement, and the improved fuel piping system information is the fuel piping system information Jb after implementing the improvement.

Note that the simulation unit S2 may calculate, based on the improvement measure generated by the simulation unit S2, the improved steam generation cost, the improved steam piping system information, and the improved fuel piping system information that are information after implementing this improvement measure.

The simulation unit S2 then updates the steam generation cost evaluation information Ia1, the steam piping system evaluation information Ia2, and the fuel piping system evaluation information Ia3 based on the improved steam generation cost, the improved steam piping system information, and the improved fuel piping system information, and displays the updated information Ia1 to Ia3 on the output means S8. Note that the display bodies in the updated steam piping system evaluation information Ia2 and fuel piping system evaluation information Ia3 may be associated with information regarding a comparison between the reference information Je and the improved steam piping system information and the improved fuel piping system information, or may be associated with information regarding a comparison between the pre-improvement steam piping system information Ja and fuel piping system information Jb and the improved steam piping system information and fuel piping system information. In the case of the former, the running status of the steam utilization facility P after implementing the improvement at the time of the reference running can be ascertained. In the case of the latter, effects achieved by implementing the improvement can be clearly ascertained. By checking the effects achieved after the improvement, the improvement measure for optimizing the running state of the steam utilization facility can be found.

The energy balance evaluation information Ia and the steam device evaluation information Ib are associated with each other. Specifically, by selecting any of the display bodies 10 to 34 and 40 to 48 in the steam piping system image Gb and the fuel piping system image Gc using the instruction input unit S7, an image of the steam device evaluation information Ib regarding the device corresponding to the selected display body is displayed. For example, by selecting a display body 23 in the steam piping system image Gb in FIG. 9, the device image Gd of the first middle/high-pressure turbine 23 and the periphery thereof shown in FIG. 11 is displayed.

Furthermore, the steam device evaluation information Ib is also associated with the drain water discharge evaluation information Ic. Specifically, by selecting, using the instruction input unit S7, a display body T, B at a drain water discharge location (the steam trap T or the valve B) displayed in the image that serves as the steam device evaluation information Ib, the drain water discharge location detail information Ic2 corresponding to the selected display body T, B is displayed.

Thus, the management means S associates three pieces of information (the energy balance evaluation information Ia, the steam device evaluation information Ib, and the drain water discharge evaluation information Ic) from different viewpoints, makes it easy to comprehend the steam system to achieve visualization, and utilizes the visualization to optimize the running state of the steam utilization facility.

The management means S can be accessed from the outside by the Internet, and more than one person, such as an administrator in charge of the steam utilization facility, a person in charge of work, and staff of a management company, can monitor and operate the management means S through a personal computer or a mobile terminal.

Next, a description will be given of a method for optimizing the running state of the steam utilization facility P using the fluid utilization facility management system according to the present disclosure.

Initially, a facility current situation examination for ascertaining basic information regarding the steam utilization facility P is implemented for a target steam utilization facility P by a searcher. In this facility current situation examination, the searcher performs diagnosis (so-called survey), such as actually diagnosing the devices (the steam generation devices Gs, the steam utilization devices Us, the fuel generation devices Gf, the fuel utilization devices Uf, peripheral devices thereof, various pipes, the steam traps T, the valve B, etc.) using a diagnostic tool or the like, or predicting a degradation state from a design drawing or the like. Then, the aforementioned reference information Je to be stored in the storage unit S6 is created based on this facility current situation examination.

As for the information to be examined, specifications and the state of the devices (the steam generation devices Gs, the steam utilization devices Us, the fuel generation devices Gf, the fuel utilization devices Gf, peripheral devices thereof, various pipes etc.), as well as the type and price of the fuel used by the steam generation devices Gs are examined. In particular, regarding the drain water discharge locations (the steam traps T, the valves B etc.), the presence of any problem in the piping layout at the drain water discharge locations, the state of the steam traps T, the consistency of the model in the installation places, the normality of the valves B in the periphery of the steam traps T, and the like are comprehensively examined, and the examination result is stored as the drain water discharge database Db in the storage unit S6 in the management means S.

In the examination, in order to remotely monitor the state of the steam utilization facility P, various detectors D are installed on the devices such as the steam traps T and the valves B as appropriate, when necessary, at locations that particularly need to be monitored.

After performing the examination and installing the detectors D as described above, the steam utilization facility P is managed using the management means S. The management means S constantly or regularly acquires various kinds of information transmitted from the detectors D (or various kinds of information collected by an inspector) to the data input unit S1, and generates the energy balance evaluation information Ia, the steam device evaluation information Ib, and the drain water discharge evaluation information Ic using the simulation unit S2 and the monitoring unit S3 in the management means S, based on the acquired information. The administrator in charge of the steam utilization facility P (or a person in charge in an external management company) causes the output means S8 to display desired evaluation information Ia to Ic through selection processing performed by using the instruction input unit S7, ascertains the running state of the steam utilization facility P, and optimizes the running state of the steam utilization facility P based on the running state.

For example, by displaying a chronological change in the steam generation cost C using the steam generation cost evaluation information Ia1 in the energy balance evaluation information Ia, the running status of the complex steam utilization facility P can be accurately ascertained and evaluated in terms of the steam generation cost C that is a single reference value. Also, with the steam generation cost evaluation information Ia1, it can be immediately understood whether the steam utilization facility P needs to be improved and whether the steam utilization facility P is running adequately, for example. If it is indicated that improvement is necessary or that the steam utilization facility P is running adequately, a factor in the necessity for improvement or a factor in the adequateness of the running can be estimated by referencing the steam balance, the balance between heat and electric power, and the fuel balance in the steam utilization facility P from the steam piping system evaluation information Ia2 and the fuel piping system evaluation information Ia3. Furthermore, a location that needs to be improved and a cause thereof can be specified by referencing the operating states at respective locations in the steam utilization facility P using the operating state determination information Ib1 in the steam device evaluation information Ib and the operating state determination information Ic1 in the drain water discharge evaluation information Ic. Furthermore, a specific improvement measure can be thought out by referencing the history information and the work instruction information using the device detail information Ib2 in the steam device evaluation information Ib and the drain water discharge location detail information Ic2 in the drain water discharge evaluation information Ic.

Furthermore, effects achieved by the improvement can be checked by selecting a desired improvement idea in the improvement idea image Gg shown in FIG. 14 using the instruction input unit S7 based on the thought improvement measure and the improvement measure indicated by the steam generation cost evaluation information Ia1.

By combining the steam piping system evaluation information Ia2 and the fuel piping system evaluation information Ia3 with the steam device evaluation information Ib, it can be ascertained as to whether the operating state and the model of a certain device and the amount of steam that is actually used or generated by this device or the amount of fuel gas used thereby are appropriate, which lead to review of the model of this device and the amount of steam used or generated by the device or the amount of fuel gas used thereby.

Thus, with the fluid utilization facility management system, it is possible to ascertain the steam generation cost C, the amount of steam, and the amount of fuel, i.e. the energy balance in the overall steam utilization facility P such as the steam balance, the balance between heat and electric power, and the running cost in the steam utilization facility P, as well as the device state in the steam utilization facility P, and the drain water discharging state in the steam utilization facility P. That is to say, the steam utilization facility P can be comprehensively ascertained from three viewpoints that are the energy balance, the device state, and the drain water discharging state. Thus, points to be improved in the steam utilization facility P can be found out to find an optimal state, and the optimization of the running state of the steam utilization facility P can be achieved.

Note that the usage of various kinds of evaluation information Ia to Ic is not limited to the above usage.

Note that the above fluid utilization facility management system is applicable to not only the steam utilization facility P but also general fluid utilization facilities. In this case, in the above embodiment, the terms may be replaced with other appropriate terms. For example, "steam" may be replaced with various "fluids", and "steam trap" may be replaced with "drain trap".

INDUSTRIAL APPLICABILITY

The fluid utilization facility management method and the fluid utilization facility management system according to the present disclosure are applicable to the evaluation of various steam utilization facilities in various fields.

DESCRIPTION OF REFERENCE SIGNS

S Fluid utilization facility management system
S1 Data input unit
S2 Simulation unit
S3 Monitoring unit
1, P Fluid utilization facility (steam utilization facility)
2, Us Fluid utilization device (steam utilization device)
3, T Drain trap (steam trap)
4, B Valve
D Detector
15, 22 Generator (first turbine generator and second turbine generator)
42 to 45 Fuel device (combustion furnace)
Db Drain water discharge database

The invention claimed is:

1. A fluid utilization facility management method comprising:

monitoring an operating state of a fluid utilization device and an operating state of a drain trap in a fluid utilization facility based on detection information from detectors installed in various places in the fluid utilization facility;

optimizing a running state of the fluid utilization facility based on this monitoring result; calculating an energy balance in the fluid utilization facility, and optimizing the running state of the fluid utilization facility based on the energy balance calculation result and the monitoring result; wherein the fluid utilization facility is a steam utilization facility that uses steam as a fluid, wherein the fluid utilization device comprises a steam utilization device in the steam utilization facility comprising a fuel device that refines fuel that is also used for steam generation, and wherein the energy balance includes a fuel balance calculated based on an amount of fuel refined by the fuel device and an amount of fuel used for steam generation.

2. The fluid utilization facility management method according to claim 1, further comprising:

making a trial calculation of an economic effect or an environmental effect achieved in a case of optimizing the running state of the fluid utilization facility from a current state.

3. The fluid utilization facility management method according to claim 1, the energy balance includes a steam balance calculated based on a steam use status of the steam utilization facility.

4. The fluid utilization facility management method according to claim 1, wherein the steam utilization device further comprises a generator that generates electric power using steam, and wherein the energy balance includes a balance between heat and electric power calculated based on a total amount of generated steam and an amount of electric power generated by the generator in the steam utilization facility.

5. The fluid utilization facility management method according to claim 1, wherein the energy balance calculation result includes comparison information regarding a comparison between the calculated energy balance and a past energy balance or a reference energy balance.

6. The fluid utilization facility management method according to claim 1, wherein an operating state of a valve is monitored in addition to the operating state of the fluid utilization device and the operating state of the drain trap, and the monitoring result includes the operating state of the valve.

7. The fluid utilization facility management method according to claim 6, further comprising:

creating a drain water discharge database including a piping layout of pipes on which the drain trap and the valve are arranged, and models and the operating states of the drain trap and the valve, wherein the monitoring result includes information in the drain water discharge database.

8. The fluid utilization facility management method according to claim 7, further comprising:

updating the drain water discharge database based on the monitoring result, wherein the monitoring result includes information in the updated drain water discharge database.

9. A fluid utilization facility management system for implementing the fluid utilization facility management method according to claim 1, the system comprising:

detectors arranged in various places in the fluid utilization facility; and a management apparatus that includes a monitoring unit for monitoring the operating state of the fluid utilization device and the operating state of the drain trap in the fluid utilization facility based on the detection information, and a simulation unit for simulating the energy balance in the fluid utilization facility.

10. The fluid utilization facility management system according to claim 9, wherein the monitoring unit monitors an operating state of a valve in addition to the operating state of the fluid utilization device and the operating state of the drain trap.

11. The fluid utilization facility management system according to claim 10, wherein the management apparatus includes a storage unit that stores a drain water discharge database including a piping layout of fluid pipes on which the drain trap and the valve are arranged, a model of the drain trap, and the operating states of the drain trap and the valve.

12. The fluid utilization facility management system according to claim 11, wherein the monitoring unit updates the drain water discharge database based on the monitoring result.

* * * * *